United States Patent
Armstrong

(10) Patent No.: US 10,981,805 B2
(45) Date of Patent: Apr. 20, 2021

(54) SOLAR HUMIDIFIER IN A HUMIDIFICATION-DEHUMIDIFICATION TYPE DESALINATION SYSTEM

(71) Applicant: Khalifa University of Science and Technology, Abu Dhabi (AE)

(72) Inventor: Peter Armstrong, Manchester, MA (US)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 16/493,075

(22) PCT Filed: Mar. 16, 2018

(86) PCT No.: PCT/IB2018/051781
§ 371 (c)(1),
(2) Date: Sep. 11, 2019

(87) PCT Pub. No.: WO2018/167732
PCT Pub. Date: Sep. 20, 2018

(65) Prior Publication Data
US 2020/0071192 A1    Mar. 5, 2020

Related U.S. Application Data

(60) Provisional application No. 62/472,287, filed on Mar. 16, 2017.

(51) Int. Cl.
*C02F 1/14* (2006.01)
*B01D 1/14* (2006.01)
(Continued)

(52) U.S. Cl.
CPC .................. *C02F 1/14* (2013.01); *B01D 1/14* (2013.01); *B01D 1/22* (2013.01); *C02F 1/08* (2013.01);
(Continued)

(58) Field of Classification Search
CPC ...... C02F 1/08; C02F 1/10; C02F 1/14; C02F 1/18; B01D 1/14; B01D 1/22
See application file for complete search history.

(56) References Cited

U.S. PATENT DOCUMENTS 3,159,554 A * 12/1964 Mount ...................... C02F 1/14
  202/234
3,397,117 A    8/1968 Smith et al.
(Continued)

FOREIGN PATENT DOCUMENTS

| CA | 2308805 | 11/2001 |
| DE | 19902476 | 7/2000 |

OTHER PUBLICATIONS

Heliostat Design Concepts, https://web.archive.org/web/20161217023728/http://www.redrok.com/concept.htm> published on Dec. 16, 2017 as per Wayback Machine, 26 pages.
(Continued)

*Primary Examiner* — Jonathan Miller
(74) *Attorney, Agent, or Firm* — Billion & Armitage

(57) ABSTRACT

An aspect of the present disclosure relates to a solar humidifier. The solar humidifier includes a solar collector comprises perforations, wherein the solar collector exhibits an absorptance in the range of 0.70 to 0.95 when dry. The solar humidifier also includes a frame on which the solar collector is mounted, wherein the frame provides at least one opening for supplying brine to a surface of the solar collector. The solar humidifier further includes a collection box, wherein the collection box includes an interior volume and is enclosed on a side by the solar collector.

20 Claims, 23 Drawing Sheets

(51) Int. Cl.
*B01D 1/22* (2006.01)
*C02F 1/08* (2006.01)
*C02F 1/10* (2006.01)
*C02F 1/18* (2006.01)
*C02F 103/08* (2006.01)

(52) U.S. Cl.
CPC ............... *C02F 1/10* (2013.01); *C02F 1/18* (2013.01); *C02F 2103/08* (2013.01)

(56) References Cited

U.S. PATENT DOCUMENTS

| | | | | |
|---|---|---|---|---|
| 4,003,365 | A * | 1/1977 | Wiegand | C02F 1/14 126/640 |
| 4,487,659 | A * | 12/1984 | Stark | C02F 1/14 202/172 |
| 9,834,454 | B2 * | 12/2017 | Frolov | B01D 1/0047 |
| 9,969,626 | B2 * | 5/2018 | Gawlik | B01D 1/0005 |
| 10,093,552 | B2 * | 10/2018 | Lee | B01D 5/009 |
| 10,473,362 | B2 * | 11/2019 | Armstrong | F24S 10/20 |
| 2004/0060808 | A1 * | 4/2004 | LaViolette | F24S 10/25 202/234 |
| 2007/0193872 | A1 * | 8/2007 | Garcia | F24S 25/10 202/234 |
| 2011/0139601 | A1 * | 6/2011 | Johnstone | B01D 1/22 202/180 |
| 2013/0118478 | A1 * | 5/2013 | Armstrong | F24S 10/30 126/643 |
| 2014/0165995 | A1 | 6/2014 | Levin | |
| 2015/0353378 | A1 * | 12/2015 | Gawlik | B01D 1/0058 159/47.3 |
| 2015/0353379 | A1 * | 12/2015 | Lee | B01D 5/0006 203/10 |
| 2020/0016507 | A1 * | 1/2020 | Minney | B01D 5/0015 |

OTHER PUBLICATIONS

International Search Report and Written Opinion dated Jun. 8, 2018, issued in PCT Patent Application No. PCT/IB2018/051781, 11 pages.
Preliminary Report on Patentability dated Sep. 26, 2019, issued in PCT Patent Application No. PCT/IB2018/051781, 5 pages.

* cited by examiner

Hourly Wind Speed Data from the TMY

SOLAR HUMIDIFIER IN A HUMIDIFICATION-DEHUMIDIFICATION TYPE DESALINATION SYSTEM

FIELD OF THE DISCLOSURE

This disclosure relates to a system and method for purifying water using a humidifying and dehumidifying process with the aid of solar energy, and in particular, a system and method that utilizes a solar humidifier for the purposes of extracting water in the form of humid air from salty or brackish water.

BACKGROUND

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

Water scarcity affects people all around the world, especially in developing countries. Desalination is a potential solution to the water scarcity problem in some regions as about 97% of water on the earth is salty. However, a hindrance to desalination in developing countries, in particular, is lack of energy and component cost. To help reduce energy consumption, solar desalination has been explored.

Solar desalination processes may be divided into two categories; direct and indirect methods. The direct method combines the heating process and the distilling process together. The advantage of the direct method is that both initial and operating costs are relatively low. In addition, direct systems may be relatively straightforward to operate. Two direct methods include the solar still and the humidification-dehumidification (HDH) solar desalination process; HDH systems can also operate from an indirect heat source. Both methods (still and HDH) mimic the natural rain cycle. In nature, sea water evaporates (by absorbing solar energy) and moistens the air. Then, with the aid of the collected heat, the humid air forms clouds. Sooner or later, the clouds condense (dehumidified) and fall as rain, generating pure water.

Conventional humidification-dehumidification (HDH) solar desalination often includes a solar collector, e.g., a single- or double-glazed flat-plate collector, a humidifier, and a condenser, as well as a recuperater, a fan, and a pump. First, the air and water are heated in a solar heater. The solar heater may be, e.g., a solar water heater or a solar air heater. Then, with the aid of collected heat the air is humidified in a humidifier. Finally, the air is cooled and condensed in a dehumidifier, generating fresh water. The air at higher temperature can carry more moisture than the air at lower temperature, thus promoting its humidification.

A number of studies have been performed on conventional HDH systems. However, many of the studies focus on the cycle configuration. The basic cycle configurations are the combination of a closed-air open-water (CAOW) or a closed-water open-air (CWOA) configuration using an air heater or a water heater to drive the cycle. In the basic cycle of the HDH solar desalination system, performance depends on, e.g., the heat capacity ratio, the effectiveness of the humidifier and dehumidifier, the top and bottom brine temperature and the relative humidity. The heat capacity ratio means that there is an optimal mass flow rate ratio (ratio between the brine and air flow rate). It was also found that the closed-air and closed-water cycles may exhibit a similar performance. Studies also examined cycles such as a multi-extraction, a multi-pressure and a thermal vapor compression cycle. However, some of the proposed new cycles have been difficult to implement.

Studies often do not involve alterations in components and there are not many components designed specifically for humidification-dehumidification (HDH) solar desalination systems. Thus, while HDH may provide relatively higher efficiency and water production per unit area it may also have a relatively higher investment cost than some traditional techniques. A potential drawback of the humidification—dehumidification desalination system is the relatively high investment cost when compared to the solar still. This relatively high cost may create a barrier for deployment of the technology in impoverished communities. So far, the relatively more efficient systems have the cost of water production around US $3-7/m$^3$.

The solar still is perhaps the most common (by number) desalination process and also the most simple given its passivity. A solar still integrates the humidification—dehumidification desalination process in a black tray basin with a glass cover on top. However, its relative simplicity comes at a cost in terms of relatively low performance (energy efficiency<0:5), depending on boundary conditions. Several geometries and materials have been proposed and analyzed to improve its performance. In addition, several new methods were introduced such as adding a solar collector to the system, to implement an active solar still and a multi-effect solar still.

Indirect methods of desalination separate the heating process and the distilling process into different components, often resulting in relatively better energy utilization. The type of energy used in the indirect method is not only limited to the thermal energy, but may also include, e.g., mechanical energy and electrical energy, which may be received from a solar photovoltaic panel. Thermal energy driven systems include multi-stage flash (MSF), multi-effect distillation (MED), thermal vapor compression (TVC), membrane distillation (MD) and HDH distillation. Two technologies that use mechanical and/or electrical energy are reverse osmosis (RO) and electro-dialysis (ED) processes. Although indirect solar desalination methods can have relatively better efficiency and performance, the systems may be relatively more complicated and may not be suitable for rural areas in developing countries.

Apart from humidification and desalination systems, solar collectors have been utilized in heating and ventilation systems. One such solar collection system involves using a perforated metal sheet and a fan, providing a relatively high life cycle and cost effective transpired air heating solar heat source. The solar collectors heat outdoor ambient air that may be introduced into a ventilation system. However, these systems do not humidify air entering into the ventilation system. Studies on these systems have derived correlations for the heat transfer coefficient as function of hole diameter "D", plate spacing, orientation of the holes, wind speed and suction velocity "V".

Accordingly, room for improvement remains in the design and development of solar desalination systems and methods. Solar collector-desalination systems should be relatively simple; as rural areas, in which these systems would be most influential, lack not only infrastructure, but also maintenance technicians and services. The systems preferably exhibit relatively low cost and complexity in both set up and operation.

SUMMARY

An aspect of the present disclosure relates to a solar humidifier. The solar humidifier includes a solar collector including perforations, wherein the solar collector exhibits an absorptance in the range of 0.70 to 0.95 when dry. The solar humidifier also includes a frame on which the solar collector is mounted, wherein the frame provides at least one opening for supplying brine to the perforated solar collector. The solar humidifier further includes a collection box, wherein the collection box includes an interior volume, and is enclosed on a side by the solar collector.

Another aspect of the present disclosure relates to a system for solar desalination of brine. The system includes a first brine fluid flow path coupled to a solar humidifier. The solar humidifier includes a solar collector including perforations, wherein the solar collector exhibits an absorptance in the range of 0.70 to 0.95 when dry. The solar humidifier also includes a frame on which the solar collector is mounted, wherein the frame provides at least one opening for supplying brine to the solar collector. Further, the solar humidifier includes a collection box, wherein the collection box includes an interior volume and is enclosed on a side by the solar collector. The system also includes a first air fluid flow path coupling the interior volume of the collection box with a condenser; and an air mover coupled to the first air fluid flow path.

Yet a further aspect of the present disclosure relates to a method of desalinating brine. The method includes supplying fresh brine to a solar collector, wherein the solar collector includes perforations and exhibits an absorptance in the range of 0.70 to 0.95 when dry, and the brine flows over a surface of the solar collector. The method further includes heating ambient air with the solar collector and humidifying the ambient air with water from the fresh brine to provide humidified air. The humidified air is then preferably drawn through the perforations in the solar collector with an air mover and cooled, removing the water from the humidified air.

BRIEF DESCRIPTION OF THE DRAWINGS

A more complete appreciation of the disclosure and many of the attendant advantages thereof will be more readily obtained by reference to the following detailed description when considered in connection with the accompanying drawings, wherein.

DETAILED DESCRIPTION OF THE EMBODIMENTS

The present disclosure is directed to a solar humidifier that combines the solar collector and humidifier components in a humidification—dehumidification desalination system into an unglazed solar collector that absorbs solar radiation directly into the seawater as it flows down the surface of the collector through which ambient air passes, exiting behind the collector in a nearly saturated state. The solar humidifier is understood to be direct; that is, the two processes of converting solar radiation to heat and using it immediately to humidify air proceed intimately and simultaneously at the absorber surface. In preferred embodiments, the solar collector is a perforated black fabric. Unlike transpired air heating solar collectors, the proposed fabric solar collector employs mass transfer to extract water from seawater. The solar collector herein act as a heat and mass exchanger, instead of only heat exchanger as in the unglazed transpired solar collector previously deployed.

Figure 1:
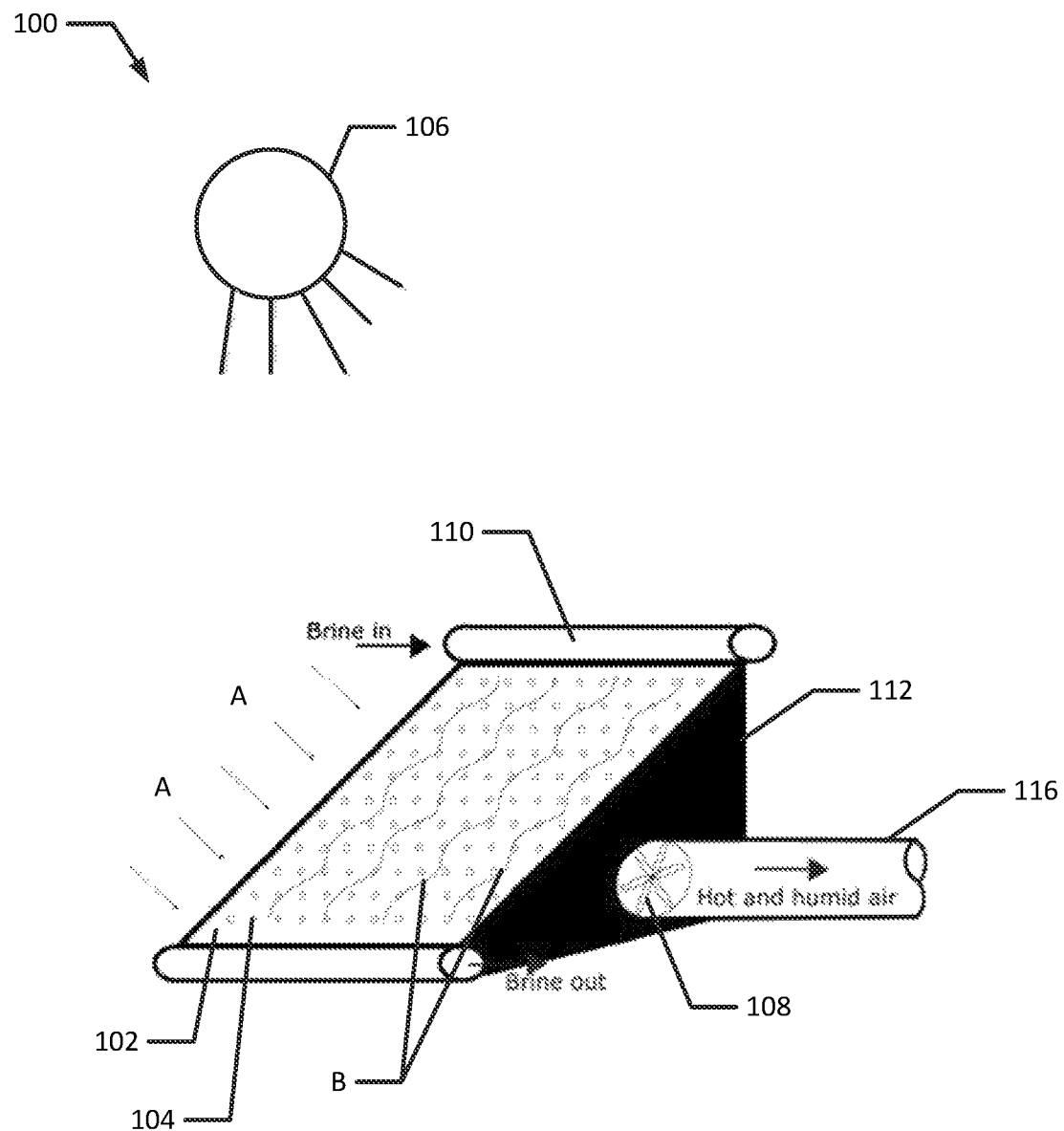
FIG. 1 is an exemplary schematic illustration of the black fabric solar collector.

FIG. 1 provides a schematic of an exemplary solar humidifier 100 of a humidification—dehumidification desalination system. The solar humidifier 100 includes a perforated black fabric 102 as an air humidifier. The solar collector 102 is made with thousands of small holes 104 and, in operation, is exposed to the sun 106. Ambient air "A" is drawn through the fabric 102 by a small fan 108. Brine "B" is pumped to the top of the fabric 102 and flows down along the fabric by gravitational force. Brine is understood herein to be salt water, including sea water, brackish water, or salt water found in certain lakes and aquifers. Brine prior and while flowing down the surface of the fabric may be understood as fresh brine. After flowing down the surface of the fabric, the brine is understood may be discharged brine.

As noted above, the solar collectors preferably include a black fabric, which presents numerous of advantages. First, it combines a solar collector and a humidifier into a single component, reducing the number of components and complexity of the humidification—dehumidification desalination system. Compared to sheet metal and glass, fabrics are relatively low-cost and highly durable, dropping both maintenance and transportation cost. Moreover, the absence of a glass or plastic cover ensures that the black fabric cannot be damaged by high stagnation temperatures (which may be understood as a relatively high equilibrium temperature which the fabric approaches if air movements tops or the fabric has dried) even though it is made from a relatively inexpensive material. In addition, the fabric solar collector exhibits texture, which aids in dispersing the brine over the surface of the collector and slows down the flow of the brine over the collector.

The solar collector is preferably black, or a relatively dark shade, to assist in improving the solar absorptivity. In particular, black collectors absorb a relatively large portion of solar energy in the visible light and near infrared regions. However, fabrics of other dark colors, such as dark gray, burgundy, forest green or deep navy may be suitable as well, particularly when wet. Preferably, the fabrics may exhibit an absorptance ($\alpha$) in the range of 0.70 to 0.95, including all values and ranges therein and preferably from 0.75 to 0.90, wherein absorptance ($\alpha$) may be generally understood as the ability of the surface of the material to absorb radiant energy from 350 nm to 2000 nm in wavelength and more preferably 350 nm to 2000 nm in wavelength. The fabrics may also preferably exhibit a reflectivity ($\rho$) in the range of 0.30 to 0.05, including all values and ranges therein, such as between 0.10 to 0.25, wherein reflectivity ($\rho$) may generally be understood as the ability of the surface of the material to reflect radiant energy from 350 nm to 2000 nm in wavelength. The fabric may further preferably exhibit relatively little transmittance ($\tau$), less than 0.1 and preferably about 0, wherein transmissivity may generally be understood as the ability of the material to transmit the radiant energy.

It is noted that when the fabrics are wet, the absorptance may increase and the reflectivity may decrease. Preferably, when wet the fabrics may exhibit an absorptance ($\alpha$) in the range of 0.75 to 0.99, including all values and ranges therein and preferably from 0.85 to 0.99, wherein absorptance ($\alpha$) may be generally understood as the ability of the surface of the material to absorb radiant energy from 350 nm to 2000 nm in wavelength. The fabrics when wet may also preferably exhibit a reflectivity ($\rho$) in the range of 0.25 to 0.01, including all values and ranges therein, such as between 0.01 to 0.15, wherein reflectivity ($\rho$) may generally be understood as the ability of the surface of the material to reflect radiant energy from 350 nm to 2000 nm in wavelength. The fabric may, when wet, further preferably exhibit relatively little transmittance ($\tau$), less than 0.1 and preferably about 0, wherein transmissivity may generally be understood as the ability of the material to transmit the radiant energy.

The fabrics may be woven or non-woven. In addition, the fabrics may include one or more natural fiber materials, such as cotton or cellulose, or one or more polymeric fiber materials such as polyester or polyamide, or combinations of natural fibers and polymer fibers. The fibers may also be formed from recycled polymer materials. In preferred embodiments, the fabric collector comprises a cotton or polymer microfiber. The fabrics are preferably wettable, wherein the water tends to fill voids in the fabric and readily displaces air from the surface of the fabric and disperse moisture quickly to create a relatively uniform water flow over the fabric.

In a particularly preferred embodiment, the fabric is a microfiber fabric of a polyester or polyamide fiber. The fibers forming the fabric have a diameter of less than 1 denier, which provides a relatively higher contact area per unit of the fabric surface than that of other, higher denier fibers. In embodiments, the fibers forming the fabric are split, creating a relatively greater surface area for retaining water.

Materials other than fabrics may be used. For example, unitary bodies such as metal sheet, plastic sheet or sheet foam, or non-unitary bodies that are fused together or supported by a substrate may be utilized such as stone, sintered glass, ceramics or recycled polymer, provided that the material may exhibit the absorptance, reflectivity and other characteristics noted above.

The solar collector is preferably perforated with holes. The holes may be circular as illustrated or exhibit other geometries, such as square, triangular or elliptical. The holes may be spaced at a pitch in the range of 0.001 meters to 0.1 meters, including all values and ranges therein and preferably 0.005 m to 0.015 m. The hole diameter (longest linear dimension) may be in the range of 0.0005 meters to 0.003 meters, including all values and ranges therein, and preferably 0.005 m to 0.002 m.

Figure 2:
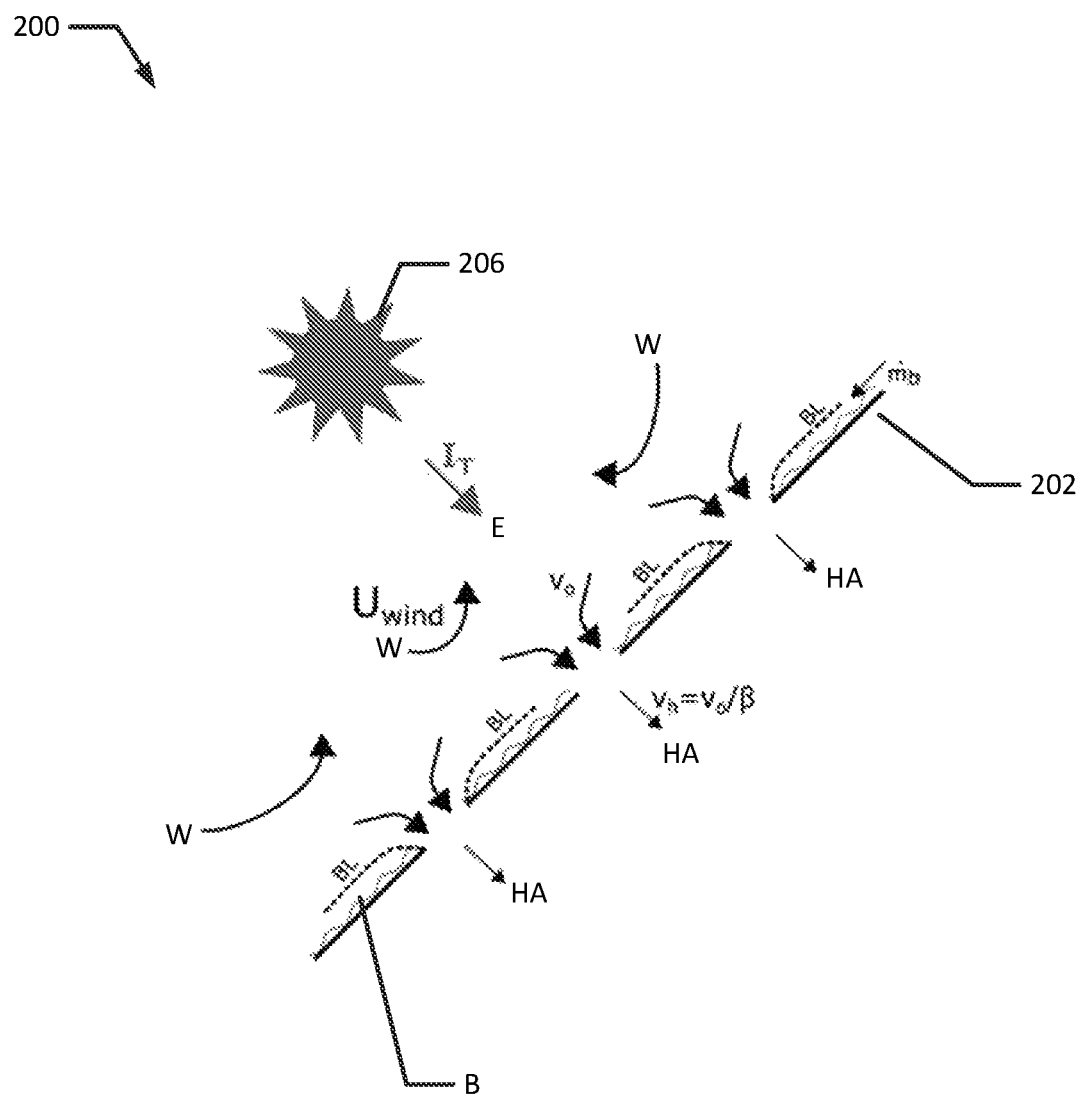
FIG. 2 is a schematic illustrating an embodiment of air movements near the surface of a humidifier-solar collector.

Without being bound to any particular theory, FIG. 2 provides a schematic illustration of the interaction of the brine "B", i.e., sea water, the surface of the fabric 202, humidified air "HA", and wind "W". As illustrated, the sun 206 emits solar energy "E" that is captured by the fabric 202 and the brine "B", i.e., sea water, running over the fabric 202. As the air passes over the fabric, moisture evaporated from the sea water "B" is picked up by the ambient air. This develops a boundary layer of relatively hot humid air, i.e., the air of the boundary layer being more hot and humid than that of the ambient air beyond the boundary layer. The perforations 204 on the fabric 202 may capture the boundary layer "BL" of hot humid air "HA" as the air flows through the perforations 204. Parameters such as sea water temperature, ambient temperature, ambient humidity, incident solar flux, and wind speed affect the process. For example, wind may strip some of the saturated air from the boundary layer.

Referring back to FIG. 1, the solar collector 102 is supported by a frame 110, which may be affixed to collection box 112, which collects the humidified air. The collection box is preferably enclosed by the solar collector and other housing materials, such as plastic sheet, relatively low permeability wet fabric, glass, metal, or wood. Reference to a collection box is understood to refer to a container of a given size and shape enclosed on at least one side by the solar collector. The collection box may assume, in non-limiting examples, triangular prism, cubic, rectangular prism, or cylindrical geometries and has an interior volume. In embodiments, the collection box may be provided by the flow path 116, described further below, or the condenser or recuperator may be fixed inside. The collection box is preferably "leak tight" or sealed to prevent the loss of humidified air to the surrounding environment.

As noted above, the humidified air is drawn from the surface of the fabric into the collection box by the fan 108. The fan may be solar powered such as by a photovoltaic device or electricity from an electric grid. In other embodiments, rather than a fan, another air mover, such as a solar chimney or a wind turbine may be utilized to move air thorough the perforations and collection container. The humid air is preferably delivered from the interior volume of the collection box through a flow path 116 to a condenser, which removes from the humidified air a portion of the moisture present in the humidified air, including the water evaporated from the brine. Flow paths are understood to provide fluid communication, i.e., the passage of brine, air, and or water there through, and may be constructed from, e.g., duct work, pipes or tubing.

Figure 3:
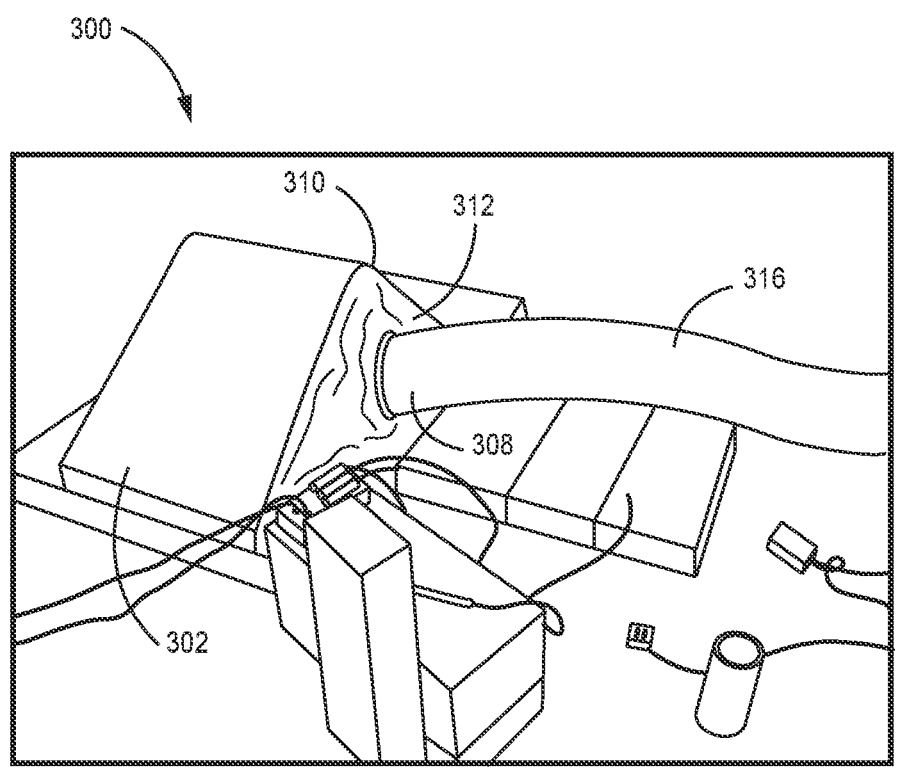
FIG. 3 is an image of an embodiment of the solar humidifier, and in particular, the embodiment used in testing.

The solar collector may be retained in a frame at an angle as illustrated in FIGS. 1 and 3, which angle may be in the range of +/−30 degrees of the noontime sun in the summer time and +60/−30 of the noontime sun in the winter time. As illustrated in FIG. 3, the solar collector 302 may be retained on and extend down from both sides of the frame 310 (only portions of which are visible). The frame preferably also delivers fresh brine to the fabric surface using the arrangement illustrated in FIG. 4a or other suitable arrangements, such as FIG. 4b. In embodiments, the frame may extend around all sides of the solar collector, extend just across the top of the solar collector, or extend across the top and bottom of the solar collector.

Figure 4A:
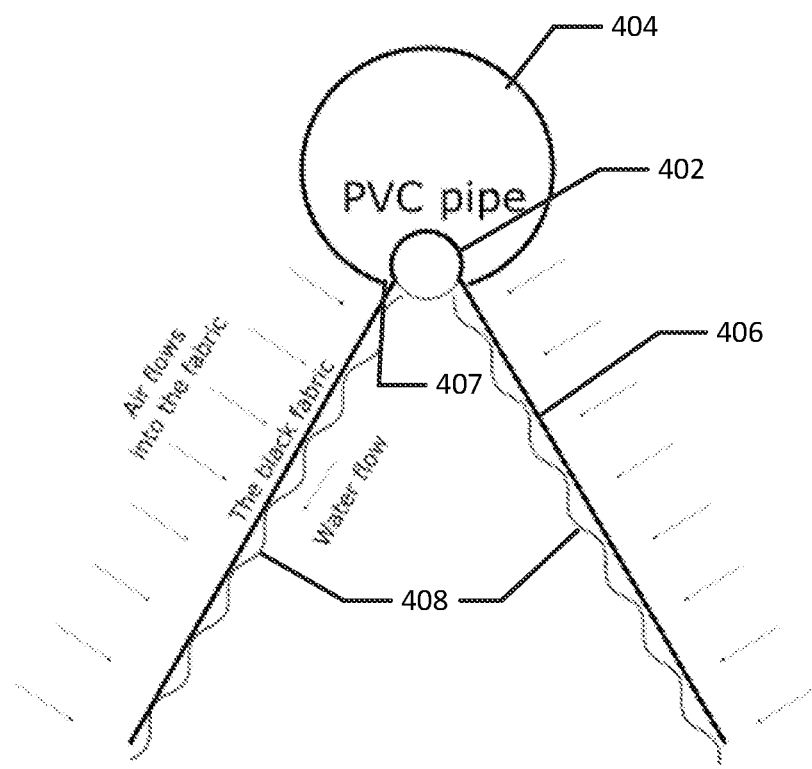
FIG. 4a is a schematic of a side view of an embodiment of the solar humidifier.
Figure 4B:
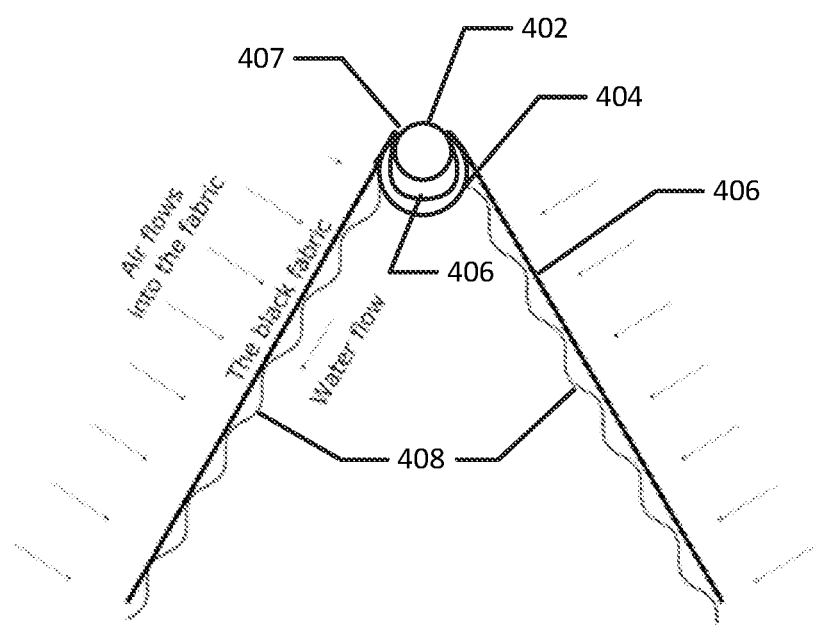
FIG. 4b is a schematic of a side view of another embodiment of a solar humidifier.

Referring now to FIGS. 4a and 4b, a portion of the frame includes at least one opening for supplying fresh brine to the solar collector. The frame ridge includes nested pipes, wherein a pipe 402 of a first smaller diameter is nested within a larger pipe 404 of a second, larger diameter. The second pipe 404 preferably includes an opening 407 along the longitudinal length of the pipe and the first pipe 402 may be seated in the opening 407 of the second pipe 404. The fabric, or other solar collector material, 406 is preferably wrapped over or around the first pipe 402 and retained between the first and second pipes, 402, 404, respectively. The brine 408 is delivered into the second pipe 404, coats the fabric wrapped over the first pipe 404 and runs down the surfaces of the fabric 406. Rivulets of brine running down the collector may be reduced by adjusting the gap between the first and second pipes. Alternatively, the solar collector may be wrapped around one pipe 402 and a plurality of openings may be provided in that pipe through which the brine is provided to the solar collector. While poly(vinyl chloride) (PVC) is referred to herein, the pipe(s) may be formed from other materials, such as bamboo or other polymer materials. In addition, the frame may be constructed or supported by other or additional materials, including metals, polymer materials or wood.

Figure 5:
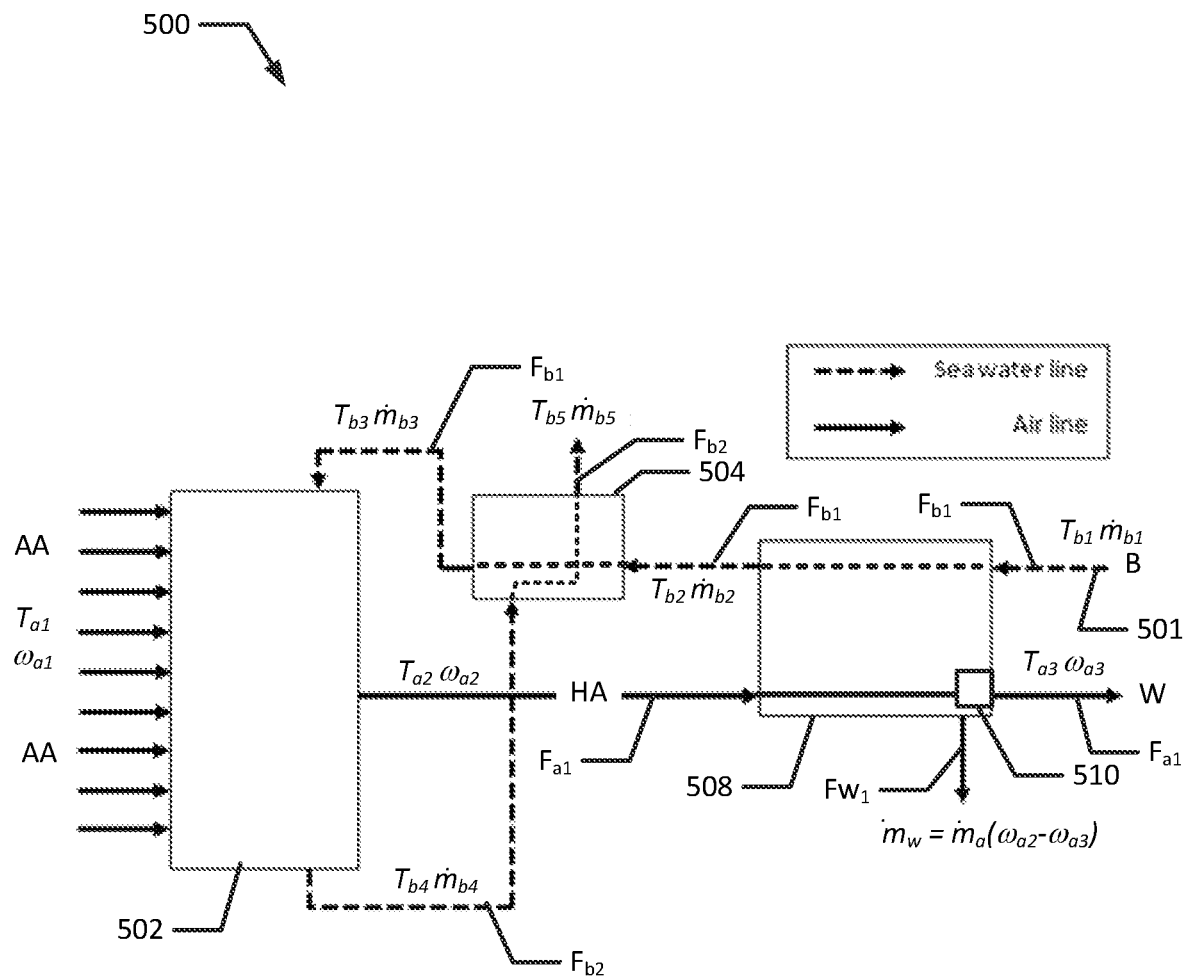
FIG. 5 illustrates a cycle configuration for humidification-dehumidification (HDH) solar desalination.

FIG. 5 illustrates a schematic of a humidification-dehumidification system 500 including the solar humidifier of FIG. 1. Fresh brine "B", in the form of, e.g., sea water, is delivered through an inlet into a first brine fluid flow path $F_{b1}$ to the solar humidifier 502 downstream of the inlet 501. The fresh brine enters the system at a first temperature $T_{b1}$. The brine may optionally pass through the condenser, upstream of the humidifier-solar collector, where the temperature of the brine may be increased $T_{b2}$, as discussed further below. The brine may then pass through the heat exchanger 504, also upstream of the humidifier-solar collector and downstream of the condenser (if coupled to the first bring flow path $F_{b1}$) to further elevate the temperature of the brine $T_{b3}$ prior to reaching the solar humidifier 502.

The brine then passes through the solar humidifier 502, where the brine is further heated $T_{b4}$ and is discharged. Ambient air "AA" (exhibiting ambient temperature $T_{a1}$ and humidity $w_{a1}$) is drawn across and into the solar humidifier 502. Water from the brine is evaporated into the passing ambient air, humidifying the air to a relatively higher humidity $w_{a2}$ with a higher or lower temperature $T_{a2}$ depending on conditions and flow rate. As may be appreciated, the salt and minerals remain in the brine and the water captured in the air is desalinated.

The humidified air "HA" is drawn into the condenser 508, in this case a cooling coil, through a first air flow path $F_{a1}$, which removes desalinated water "W" from the air. The air, with its remaining moisture, is then discharged back into the atmosphere at a relatively lower humidity $w_{a3}$ and temperature $T_{a3}$ than the humidified air, $w_{a2}$ and $T_{a2}$, although the humidity and temperature may be higher or lower than the ambient air $w_{a1}$ and $T_{a1}$. The air is optionally drawn through the system by an air mover 510, such as a fan, solar chimney, or wind turbine.

Turning back to the condenser, some or all of the heat of condensation may be recovered. Relatively cool fresh brine $T_{b1}$ entering the condenser upstream of the humidifier-solar collector may assist in reducing the temperature of the humidified air entering the condenser downstream of the humidifier-solar collector and the heat from the humidified air condensing may increase the brine temperature $T_{b2}$ entering the system upstream of the humidifier-solar collector as noted above. Further, the brine discharged from the solar humidifier 502 may pass through a second brine flow path $F_{b2}$ to the heat exchanger 504 downstream from the solar humidifier 502, which provides a recuperater and warms the relatively cool fresh brine entering the solar humidifier 502 and reduces the temperature of the discharge brine $T_{b5}$.

In preferred embodiments, the surface areas of the condenser and heat exchanger may individually be 0.5 to 1.5 times the area of the solar collector, including all values and ranges therein. Larger condensers and heat exchangers help improve performance but increase the cost of the system. It is noted that the water yield $\dot{m}_w$ may be calculated from the difference between the condenser inlet air humidity $w_{a2}$ and the outlet air humidity $w_{a3}$ multiplied by the air mass flow rate $\dot{m}_a$ according to the following relationship: $\dot{m}_w = \dot{m}_a (w_{a2} - w_{a3})$.

Figure 6:
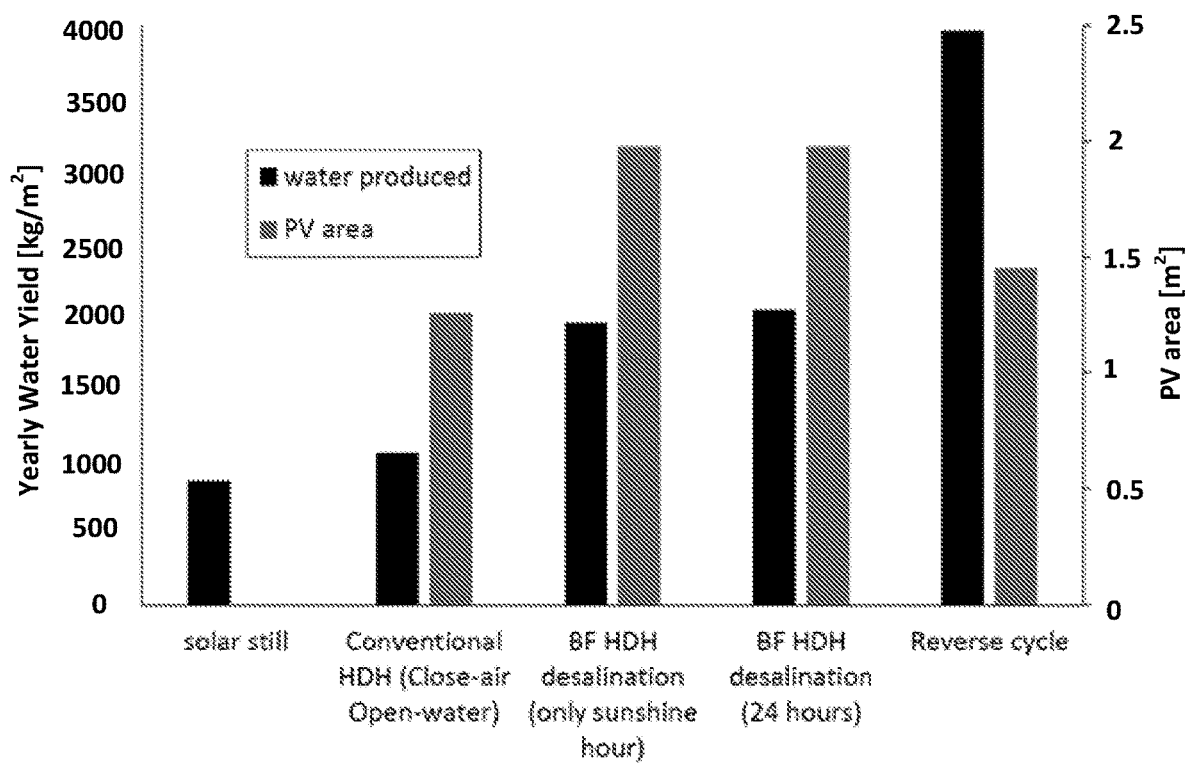
FIG. 6 shows a comparison of all model simulated (one year simulation) humidification-dehumidification (HDH) solar desalination cycles.

The solar humidifier described herein is capable of providing 2,000 kg of water each year per square meter in UAE weather conditions; water that is understood to be relatively safe for drinking purposes. To provide enough water per person per year, a solar humidifier of 1.5 square meters may be sufficient. Compared to other textbook processes, shown in FIG. 6, the solar humidifier provides a relatively cheaper, more durable system and generally requires less pump/fan energy than other processes such as conventional HDH (Closed-air, open-water systems) and reverse cycle HDH systems and other indirect solar desalination systems. Further, the system may be filled manually in batches or with a pump.

Figure 7:
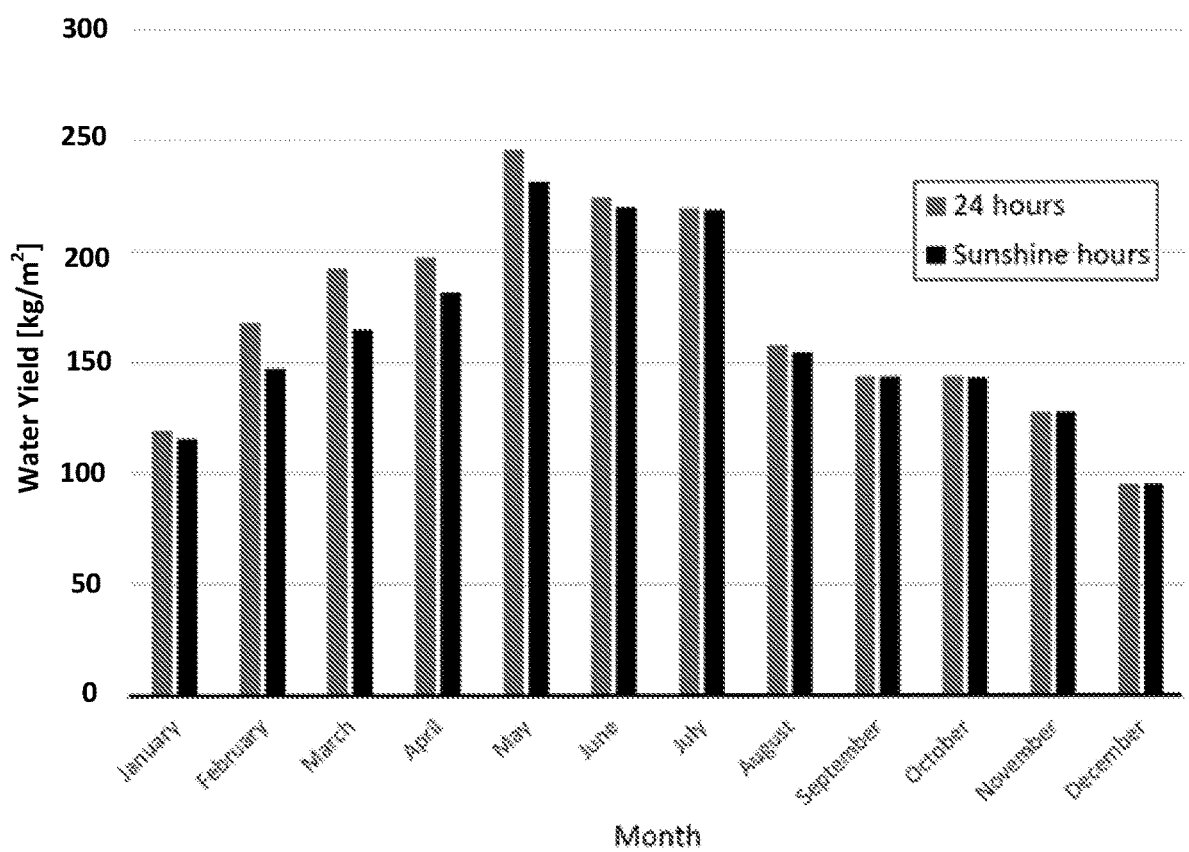
FIG. 7 is a graph of estimated monthly water productivity for both 24 hour and sunshine hour only production.

It is noted that, in the simulated case, only a slightly larger amount of water is recovered running the system herein 24 hours versus during sunshine hours only over the course of a year. FIG. 7 illustrates the difference in water produced throughout the year when operating during sunlight hours only vs. 24 hour operation. While only a little more water is produced during non-sunlight hours, it demonstrates that water may still be produced in favorable conditions. The difference in water produced yearly is noted in Table 1 below. It is noted that while there is relatively strong solar radiation in June and July, the sea water temperature is relatively high, which may negatively impact the condensation process.

TABLE 1

Difference in water produced during sunlight hours and 24 hours

|  | 24 Hours | Sunshine Hours |
| --- | --- | --- |
| Water Yield (kg/m$^2$) | 2034.85 | 1944.01 |

Further, the solar humidifier provides both a humidifier and solar-collector the simultaneously in one device. The humidification—dehumidification desalination system herein is an improvement on the solar still as it is understood to exhibit relatively higher performance because optical losses are less and because closely spaced perforations and associated boundary layer air flow improve mass transfer of water to air. In addition, incoming seawater generally provides a relatively better heat sink for condensation than the passively-cooled glass cover.

It is also noted that in using fabric, in particular, the fabric does not corrode; reducing the costs of maintenance, extending equipment life, and reducing the overall cost of the water. The fabric may also be washed to reduce mineral deposits on the fabric and allowing for extended use of the fabric. The system, as a whole, is relatively easier to disassemble and reassemble, which may be accomplished without any tools. It is also noted that the cost and weight of glass-covered systems is eliminated. And, finally, as the system is not covered, such as in glass-covered systems, the systems do not overheat. While overall system performance may be less than that of typical humidification-dehumidification solar desalination systems, the relative cost of water may still be reduced due to the availability of materials and simplicity of design.

As the system is adapted to work using solar energy, the system may be deployed in geographical locations that receive solar energy and are next to the sea or salty lakes. Regions such as the Gulf, Far East Asia, the Indian subcontinent, Africa, Latin America and the Pacific Islands may benefit from the deployment of this technology.

Experiment and Validation

Annual water yield for the black fabric solar humidification—dehumidification desalination system and a conventional solar humidification—dehumidification desalination system, described further below, were predicted by applying weather and the sea water temperature data to a mathematical model of each system. The performance of the systems was compared to a conventional solar still as described above. A prototype of the black fabric solar humidifier, as illustrated in FIGS. 1 and 3, was constructed to test and validate the accuracy of the mathematical models. The prototype included a black microfiber fabric made from 80% polyester and 20% nylon of 180 cm×60 cm. The fabric was attached to a PVC pipe as shown in FIGS. 3 and 4b, referenced above, wherein it was extended down both sides of the tent frame. The experiment was performed in a confined room that had air ventilation, by way of a fan, to keep the relative humidity and temperature inside the room stable at about 50% relative humidity (RH) and 24° C.

The fabric was retained on the tent, particularly the top of the tent, using two PVC pipes of different diameters, as illustrated in FIG. 4, to create a relatively uniform water flow. The large PVC pipe was 5 cm in diameter and the small PVC pipe was 2 cm in diameter. In order to attach the black fabric, a longitudinal channel was made on the larger PVC pipe and the smaller PVC pipe was put inside together with the fabric as depicted in the figure. The fabric was perforated with 1.5 mm diameter circular holes and spaced at a 7.5 mm pitch.

The data collection was done using a Campbell Scientific CR1000 measurement and control system. The system is controlled by the CRBasic Code. The system has a voltage resolution of 0:33 mV with +/−0:06% accuracy. The accuracy of the thermistor in the data logger is +/−0.1 C within 50 K of room temperature.

Type T thermocouples (copper-constantan) ASME special limits of error were used in the experiment. Temperatures were measured at four different places: ambient air, air outlet, water inlet and water outlet. The water inlet measurement was made by putting the thermocouple inside the PVC pipe and glued with an epoxy. Another thermocouple was placed at the bottom of the fabric to measure the outlet water temperature. The air inlet temperature was measured 10 cm from the fabric's surface. The last thermocouple was put inside the flexible duct to measure the outlet air temperature.

Figure 8:
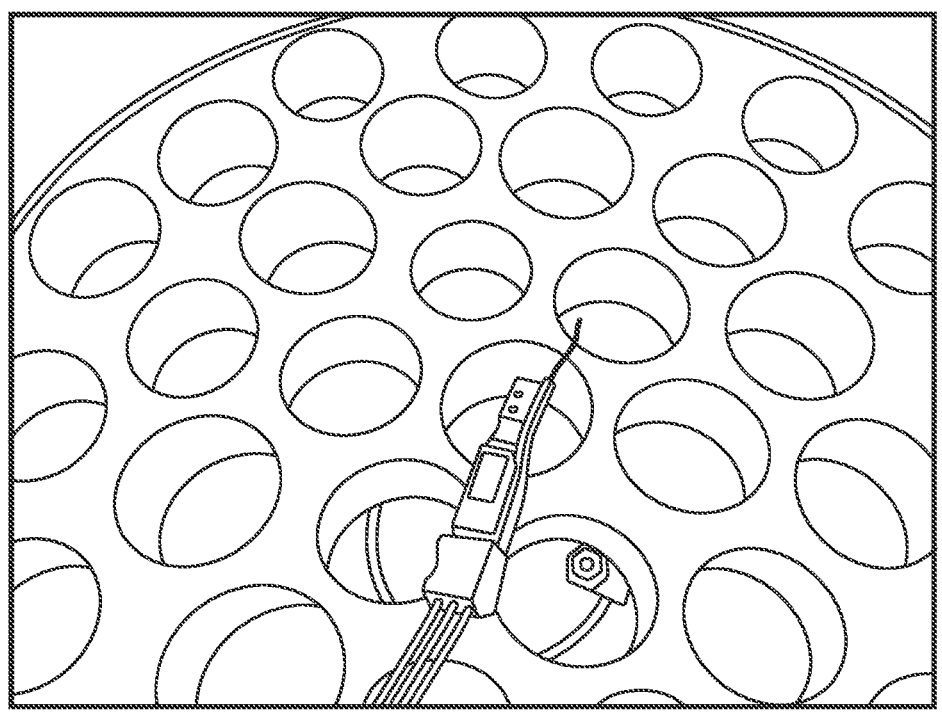
FIG. 8 illustrates an exemplary placement of a thermocouple and a relative humidity sensor on the duct work providing a flow path from the solar humidifier.
Figure 9A:
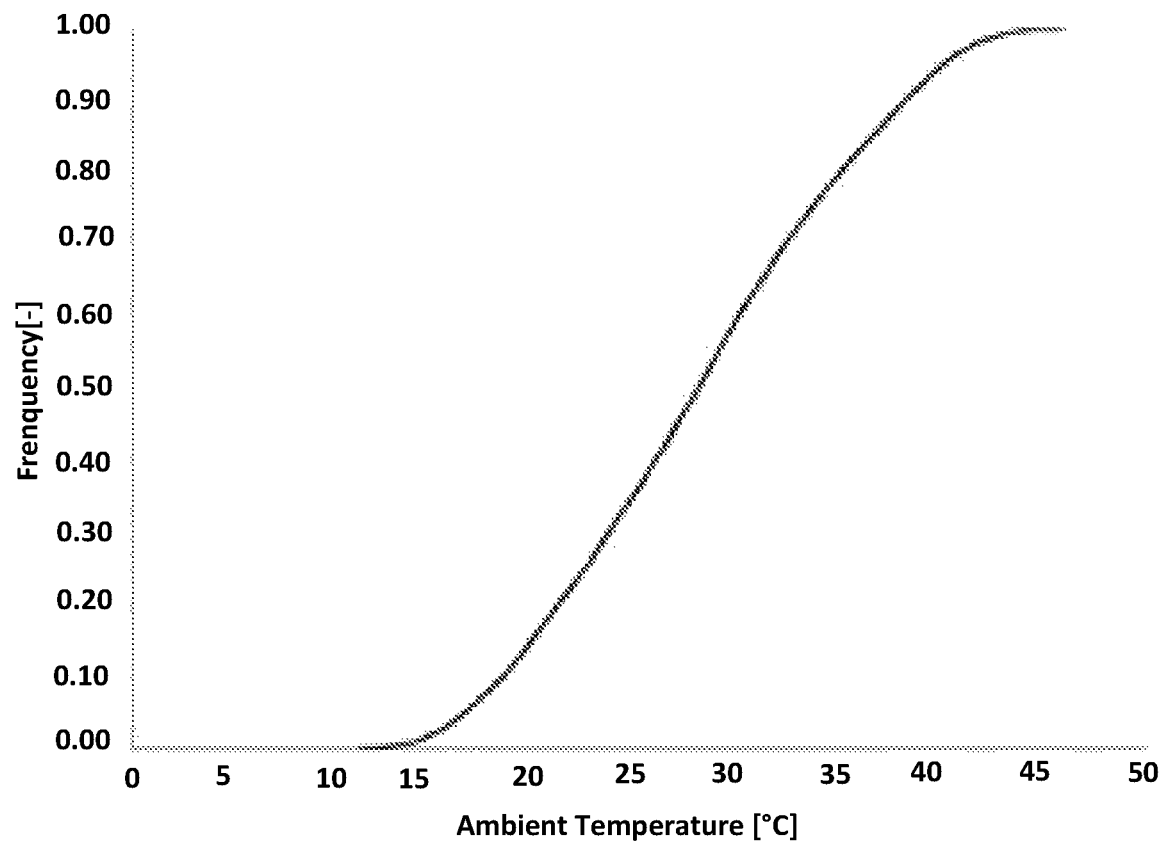
FIG. 9a illustrates annual cumulative distributions of temperature, taken from the typical meteorological year (TMY) weather data for UAE.
Figure 9B:
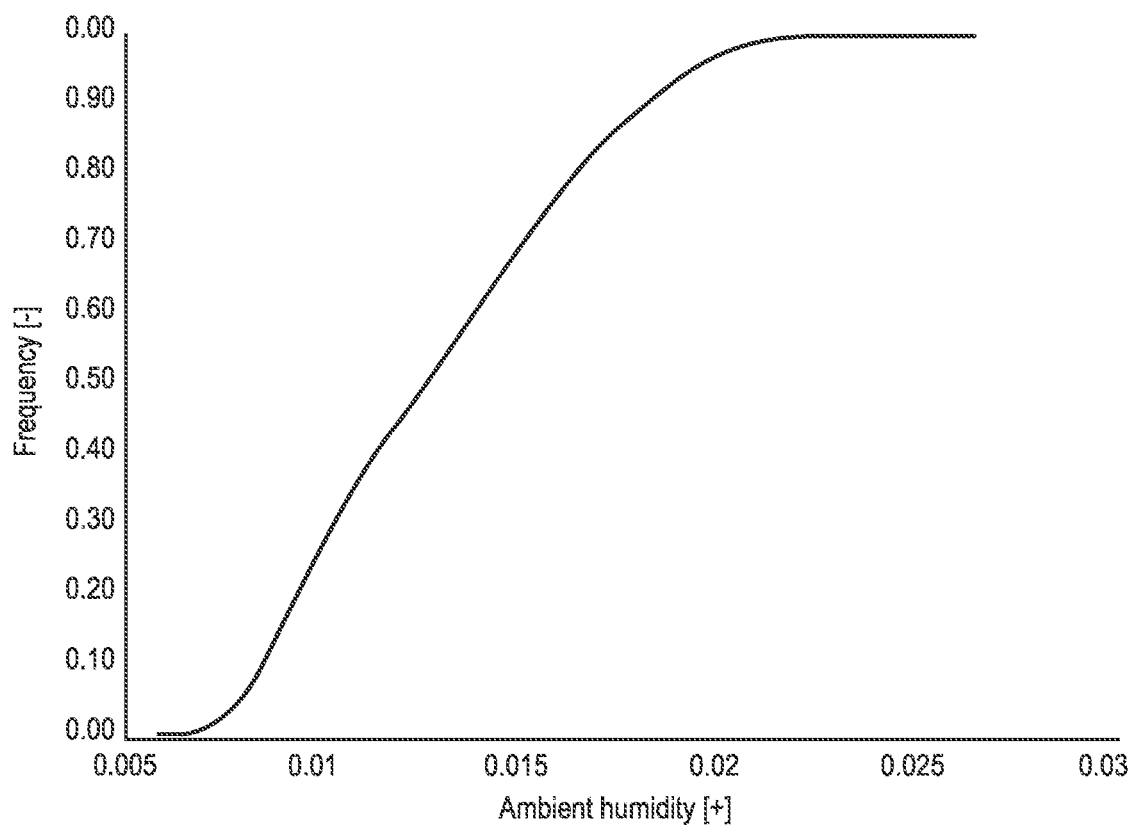
FIG. 9b is a graph of the annual cumulative distribution of humidity, taken from the typical meteorological year (TMY) weather data for UAE.
Figure 9C:
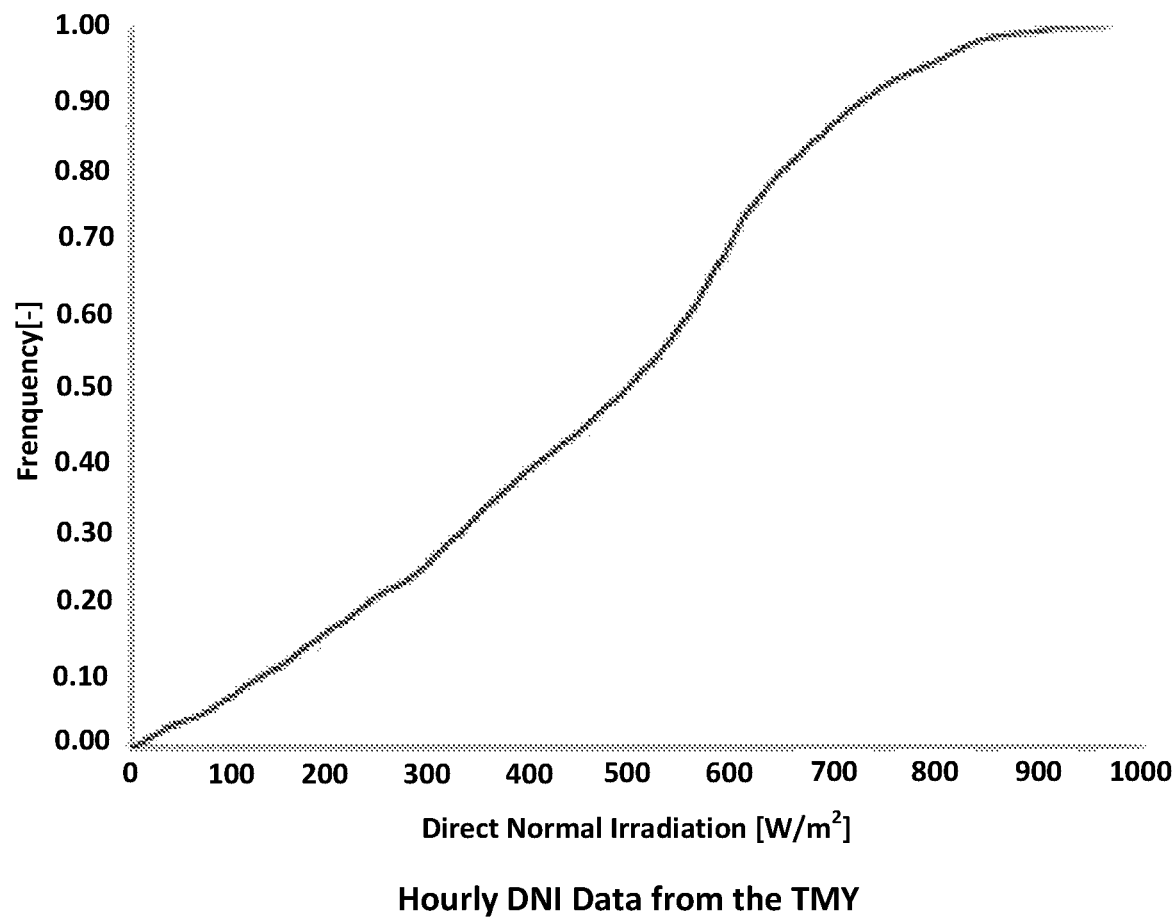
FIG. 9c is a graph of the annual cumulative distribution of DNI, taken from the typical meteorological year (TMY) weather data for UAE.
Figure 9D:
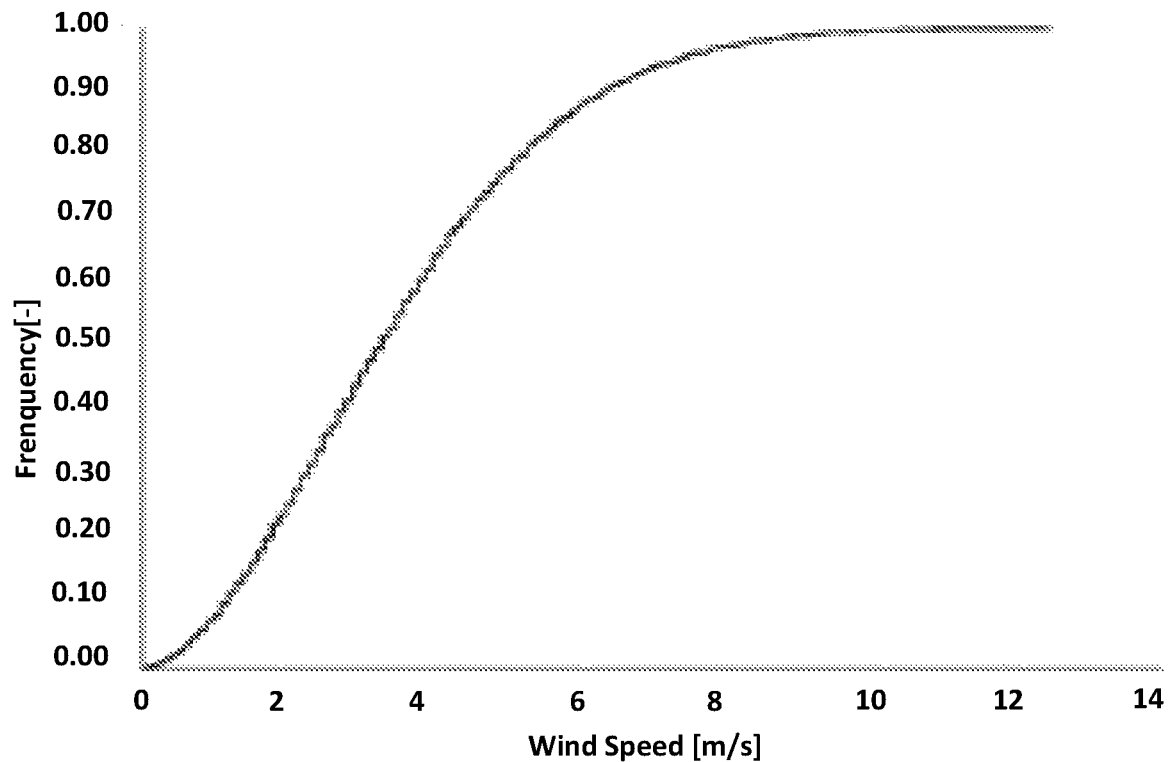
FIG. 9d is a graph of the annual cumulative distribution of wind speed, taken from the typical meteorological year (TMY) weather data for UAE.

Honeywell humidity sensors series HIH-4010 were used to measure the relative humidity. The humidity was measured at two locations; the ambient air and the outlet air. The ambient air was measured by putting the sensor 10 cm above the black fabric's surface. Another one was placed inside the flexible duct together with a thermocouple as shown in FIG. 8. The outlet is positioned at the end of the flow path 116 (see FIG. 1)/316 (see FIG. 3).

The air flow was measured by a Series B Minneapolis Duct Blaster System. The duct blaster comes with a pressure gauge (DG-700 pressure gauge) and three standard flow plates. The pressure gauge measure a pressure difference between two points. As the size of the flow plates and air density are known, the pressure difference may be converted into the air flow rate with relatively high accuracy.

The wind speeds in the testing room were measured by Testo 435 Hot Wire CFM Anemometer. The device has the resolution of 0:01 m=s with the accuracy of +/−0:03 m/s+5% of mv. The measurements were taken above the black fabric parallel to the surface.

A water tank, a graduated beaker, and a stop watch were used to measure the water flow rate. The water was measured using the beaker before it was put into the tank. The tank was marked such that each mark refers to the same amount of water. A valve at the bottom of the tank was used to adjust the flow rate. The mark level on the tank with the stop watch can measure the water flow rate.

The apparatus was tested with the fabric positioned at different tilt angles to find the maximum water flow rate that provided relatively uniform water flow across the surface of the fabric. Four tilt angles were examined: 30°, 40°, 50° and 60°. The steeper the tilt angle, the higher water flow rate the apparatus could handle. It was found that the flow rate limit was affected by the water clogging at the exit of the water channel causing reverse flow. The results of the water flow rate are indicated in Table 2.

TABLE 2

Tilt Angle Results

| | Tilt Angle ° | | | |
| --- | --- | --- | --- | --- |
| | 30 | 40 | 50 | 60 |
| Maximum Water Flow Rate (kg/s) | 0.0521 | 0.0791 | 0.117 | 0.168 |

Performance of the solar collector may depend, in part, on the radiation properties, particularly in the solar wavelength region. The Sun radiates 99.5% of its energy in the near infrared, visible and UV wavelengths ranging from 300 nm to 3000 nm with most of this energy (9% of ASME AM1.5) between 300 nm and 2500 nm. As the properties of a material at different wavelengths can be different, the properties of the solar collector were measured over the solar spectrum using a Lambda1050 UV/Vis/NIR spectro-reflectometer. The device was designed to measure the properties in wavelengths from 175 nm to 3300 nm. The disposition of radiation striking any surface is divided into absorptivity, reflectivity and transmissivity as in equation 1. The Lambda 1050 was set to measure the reflectivity and transmissivity at every nanometer from 300 to 2500 nm for 0.6 seconds each. Then, the absorptivity could be calculated from the equation 1.

$$\alpha + \tau + \rho = 1 \quad (1)$$

Solar absorptivity is the ratio of energy absorbed by the material to the total energy incidence on the material, as defined in equation 2, below.

$$\alpha = \frac{\int_{300nm}^{2500nm} \alpha(\lambda) \times I(\lambda) d\lambda}{\int_{300nm}^{2500nm} I(\lambda) d\lambda} \quad (2)$$

The air-mass spectrum weighted results are shown in Table 3. The wet fabric exhibited higher solar absorptivity than the dry fabric because the fabric color was darker (in NIR as well as visible wavelengths) when it is wet. The absorptivity of the wet fabric was used in the simulations below.

TABLE 3

| Solar absorptivity | | |
|---|---|---|
|  | Dry | Wet |
| Absorptivity ($\alpha$) | 0.764 | 0.888 |
| Reflectivity ($\rho$) | 0.236 | 0.112 |
| Transmissivity ($\tau$) | ~0 | ~0 |

Simulation

The simulations herein are provided for purposes of understanding the potential effect of various factors on the performance of the solar humidifier system. The simulations do not imply that the subject matter described herein is bound to any particular theory or behavior model. In simulations, the black fabric solar humidifier was coupled with a conventional condenser (cooling coil) to create a complete humidification-dehumidification (HDH) cycle. The cooling coil was divided into two regions; dry coil and wet coil. An effectiveness model for each of these separate regions was previously derived. The dry coil region may occur near the end where the air enters and water exits. The air is understood to start condensing as it reaches a point where the coil surface temperature is lower than the air dew point temperature. Sea water can be used as a heat sink to recover latent heat of condensation.

Figure 10:
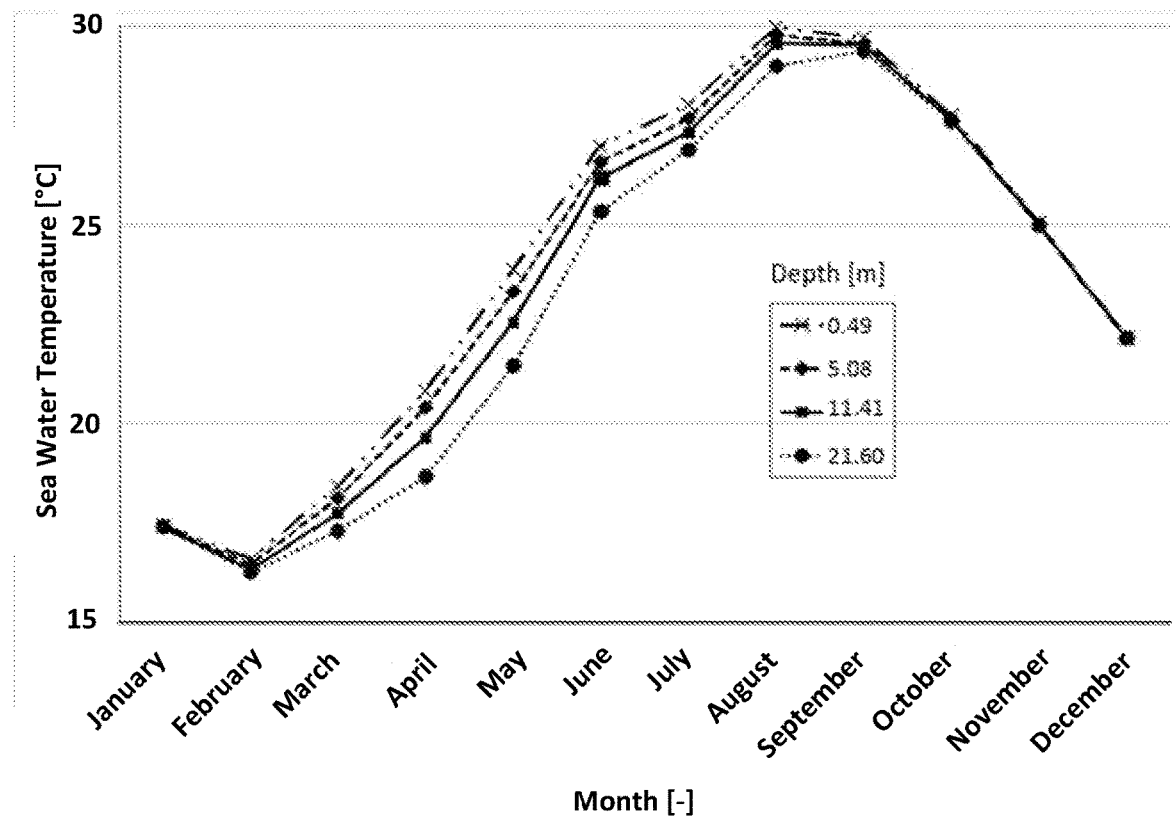
FIG. 10 shows the monthly Persian Gulf sea water temperature at various depths.

To estimate annual water yields, the different HDH cycles were simulated under identical boundary conditions. The Abu Dhabi typical meteorological year (TMY) and Abu Dhabi CMCC Global Ocean Physical Reanalysis System (C-GLORS) data in 2005 was used to simulate the performance of the black fabric solar dehumidifier and other solar HDH systems as well as the traditional solar still. The TMY are data sets of hourly average values for a year period. The sets of data include solar radiation, temperature, humidity, wind speed, etc. The TMY data is shown in terms of Probability Density Functions (PDF) in FIG. 9a to FIG. 9d. In addition, the Centro Euromediterraneo Sui Cambiamenti Climatici (CMCC) data set reports temperatures at 50 levels of ocean depth around the world. The data near Abu Dhabi in the Persian Gulf is shown in FIG. 10. Since there is relatively little difference in the temperature at various depths, the sea water data on the ocean surface (most conservative choice) was used in the simulations.

Figure 11:
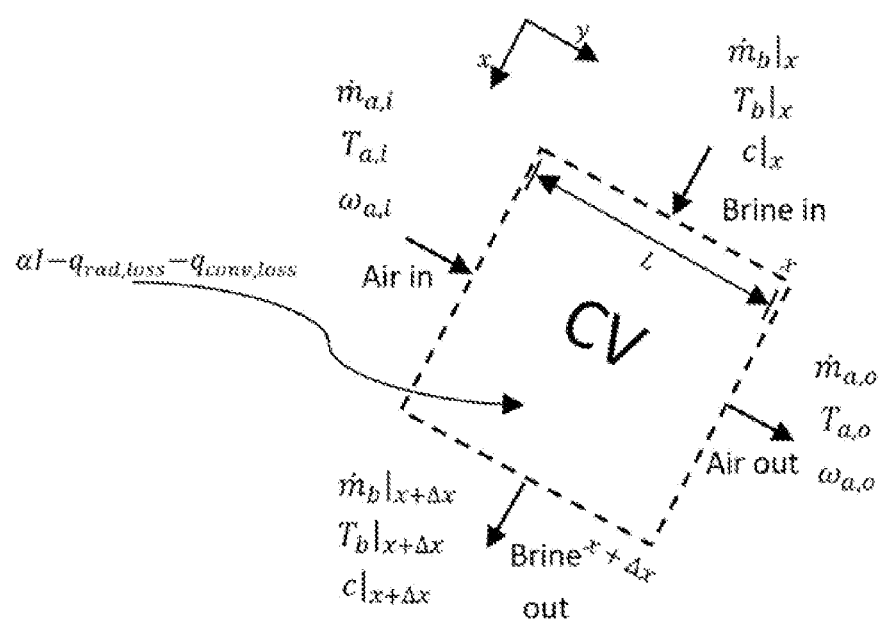
FIG. 11 is a schematic of the differential element used in a mathematical model.

A mathematical model of the black fabric as humidifier/solar collector was developed in order to study its performance at the various selected boundary conditions. A schematic of a differential element of the black fabric used in the mathematical model is shown in FIG. 11. A few assumptions were applied to the model as follows. The sea water is assumed to flow uniformly along the black fabric and solar radiation is absorbed uniformly by the black fabric. The fabric and sea water have the same temperature which is uniform across the width of the absorber. The fabric is relatively thin compared to the height of the collector and air is drawn uniformly through the holes in the black fabric.

From the assumptions above, the 1-dimensional ordinary differential equations (ODEs) of heat and mass balance of the black fabric were developed. A mass balance on the water gives:

$$\frac{d\dot{m}_b}{dx} + \frac{\dot{m}_a}{H}(\omega_{a,o} - \omega_{a,i}) + \frac{\dot{m}_{mw,loss}}{H} = 0 \quad (3)$$

Where x is measured along the slope of the black fabric downward from the seawater distribution pipe, $\dot{m}_{mw,loss}$, is water loss rates, i.e. that part of evaporated water carried off by the wind, and H and W are height and width of the fabric. The salt mass balance provides:

$$\frac{d\dot{m}_s}{dx} = 0 \quad (4)$$

Finally, the energy balance between the air and the sea water is given by:

$$\frac{d(\dot{m}_b h_b)}{dx} + \frac{\dot{m}_a}{H}(h_{a,o} - h_{a,i}) - (I_T \alpha - q_r - q_c)W + \dot{m}_{mw,loss} h_b = 0 \quad (5)$$

where $h_{a,o}$ and $h_{a,i}$, are entering and leaving air enthalpies and $h_b$ is brine enthalpy at location x. The energy balance equation (eqn. 5) can be expanded further by applying the chain rule thus:

$$h_b \frac{d\dot{m}_b}{dx} + \dot{m}_b \frac{dh_b}{dx} + \frac{\dot{m}_a}{H}(h_{a,o} - h_{a,i}) - (I_T \alpha - q_r - q_c)W + \dot{m}_{mw,loss} h_b = 0 \quad (6)$$

The second term of equation 6 is the rate of change of specific sea water enthalpy along the black fabric surface (x-axis). The sea water enthalpy is a function of salinity and temperature, and both of them change along the x-axis. Thus, the equation may be expanded further using the sea water properties from thermophysical properties of seawater (source noted below). The evolution of sea water enthalpy along the x-axis is thus given by:

$$\frac{dh_b}{dx} = \frac{h_b}{dc}\frac{dc}{dx} + \frac{h_b}{dT_b}\frac{dT_b}{dx} \qquad (7)$$

A review of sea water thermophysical properties has been done by Mostafa H Sharqawy, John H Lienhard, and Syed M Zubair, Thermophysical properties of seawater: a review of existing correlations and data, *Desalination and Water Treatment*, 2010. Combining equations 6 and 7 gives:

$$h_b\frac{d\dot{m}_b}{dx} + \dot{m}_b\left(\frac{h_b}{dc}\frac{dc}{dx} + \frac{h_b}{dT_b}\frac{dT_b}{dx}\right) + \qquad (8)$$
$$\frac{\dot{m}_a}{H}(h_{a,o} - h_{a_i}) - (I_T\alpha - q_r - q_c)W + \dot{m}_{mw,loss}h_b = 0$$

Equations 3, 4 and 8 give a description in heat and energy balance of the system. The differential equations (3, 4, 8) can be solved if the outlet conditions for one of the streams and the water loss from evaporation are known. The air outlet conditions can be calculated by the air-side heat and mass transfer equations. These two equations have been used extensively in heat and mass transfer devices such as in cooling towers and liquid-desiccant regenerators.

The outlet air temperature is calculated based on a heat transfer coefficient ($h_c$):

$$\dot{m}_a dh_a = h_c A(T_b - T_a) + h_{wv}\dot{m}_a d\omega_a \qquad (9)$$

Similarly, the outlet air humidity ratio is calculated from a mass transfer coefficient ($h_D$):

$$\dot{m}_a d\omega_a = h_D A(\omega_{a,T_b,\text{sat}} - \omega_a) \qquad (10)$$

The water loss is an extra term that is not usually given much attention in heat and mass transfer devices like cooling tower. The water loss may be calculated from mass loss transfer coefficient ($h_{D,loss}$) thus $$\dot{m}_{wv,loss} = h_{D,loss} A(\omega_{a,T_b,\text{sat}} - \omega_a) \qquad (11)$$

Equation 9 and 10 can be simplified into heat and mass effectiveness by integrating the equations from the inlet to outlet. The mathematics manipulations below are the steps to find the temperature and humidity effectiveness. The heat transfer effectiveness is derived by integrating equation 9. The procedure to derive heat transfer effectiveness follows $$\dot{m}_a dh_a = h_c A(T_b - T_a) \qquad (12)$$

Applying a constant moist air specific heat $$\dot{m}_a c_{p,a} dT_a = h_c A(T_b - T_a) \qquad (13)$$

integrating equation 13 from the inlet to the outlet $$\frac{T_{a,o} - T_{amb}}{T_b - T_{amb}} = 1 - e^{\frac{h_c A}{\dot{m}_a c_{p,a}}} \qquad (14)$$

Defining NTU as $$NTU = \frac{h_c A}{\dot{m}_a c_{p,a}} = \frac{h_c A}{G_a c_{p,a} A'} \qquad (15)$$

and heat transfer effectiveness as $$\varepsilon_h = \frac{T_{a,o} - T_{amb}}{T_b - T_{amb}} \qquad (16)$$

Rewriting the fabric area (A) in terms of total fabric area ($A^o$) and the fabric porosity (f), $$\frac{A}{A'} = 1 - \phi \qquad (17)$$

where A is the total fabric area minus the aggregate hole area (perforated area). Substituting equations 15, 16 and 17 into equation 14 yields for heat transfer the formula $$\varepsilon_h = 1 - e^{-NTU} \qquad (18)$$

The humidifying effectiveness is determined in a similar manner as follows.

Integrating equation 10 from the inlet to the outlet $$\frac{\omega_{a,o} - \omega_{a,i}}{\omega_{a,T_b,\text{sat}} - \omega_{a,i}} = 1 - e^{\frac{-h_D A}{\dot{m}_a}} \qquad (19)$$

Defining humidifying NTU and effectiveness as $$NTU_m = \frac{h_D A}{\dot{m}_a} = \frac{h_D A}{GA^*} \qquad (20)$$

$$\varepsilon_m = \frac{\omega_{a,o} - \omega_{amb}}{\omega_{a,T_b,\text{sat}} - \omega_{amb}} \qquad (21)$$

Substituting equation 20, 21 and 17 into equation 19

$$\varepsilon_m = 1 - e^{-NTU_m} \qquad (22)$$

Equations 3, 4, 8, 18 and 22 together can be solved numerically for all of the outlet conditions.

However, this outcome of the mathematical model development is a system of differential equations (ODEs), which cannot be solved analytically. They are solved using the ODE45 function in the MATLAB. The ODE45 function applies the Runge-Kutta numerical method to solve differential equations numerically. The outlet air conditions of the first element are determined first. Then, the water conditions of the next differential element are computed. One can then evaluate the air and sea water properties according to the given boundary conditions, determine the air outlet conditions using the air-side heat and mass transfer equation, calculate the sea water outlet conditions by applying the heat and mass balance equations and repeat all of the steps again on successive elements until all of the elements are solved.

Heat transfers in the black fabric come in two forms: convection and radiation. The convection heat transfers are the result of suction airflow (generated by a small fan behind the fabric) and cross-flow over the exposed front surface (natural wind). The suction flow collects energy, whereas the cross-wind creates a heat loss to environment. The heat transfer coefficients of both phenomena are found in e.g., R R King, D C Law, K M Edmondson, C M Fetzer, G S Kinsey, H Yoon, R A Sherif, and N H Karam. 40% efficient metamorphic gainp/gainas/ge multijunction solar cells. Applied physics letters, 90(18):183516-183516, 2007; and C F Kutscher. An investigation of heat transfer for air flow through low porosity perforated plates. PhD thesis, University of Colorado, 1992. Radiation is a function of temperature and emissivity of the black fabric. The mass transfers behave similarly to convection heat transfer. The heat and mass transfer analogy is used to estimate mass transfer rates.

Figure 12:
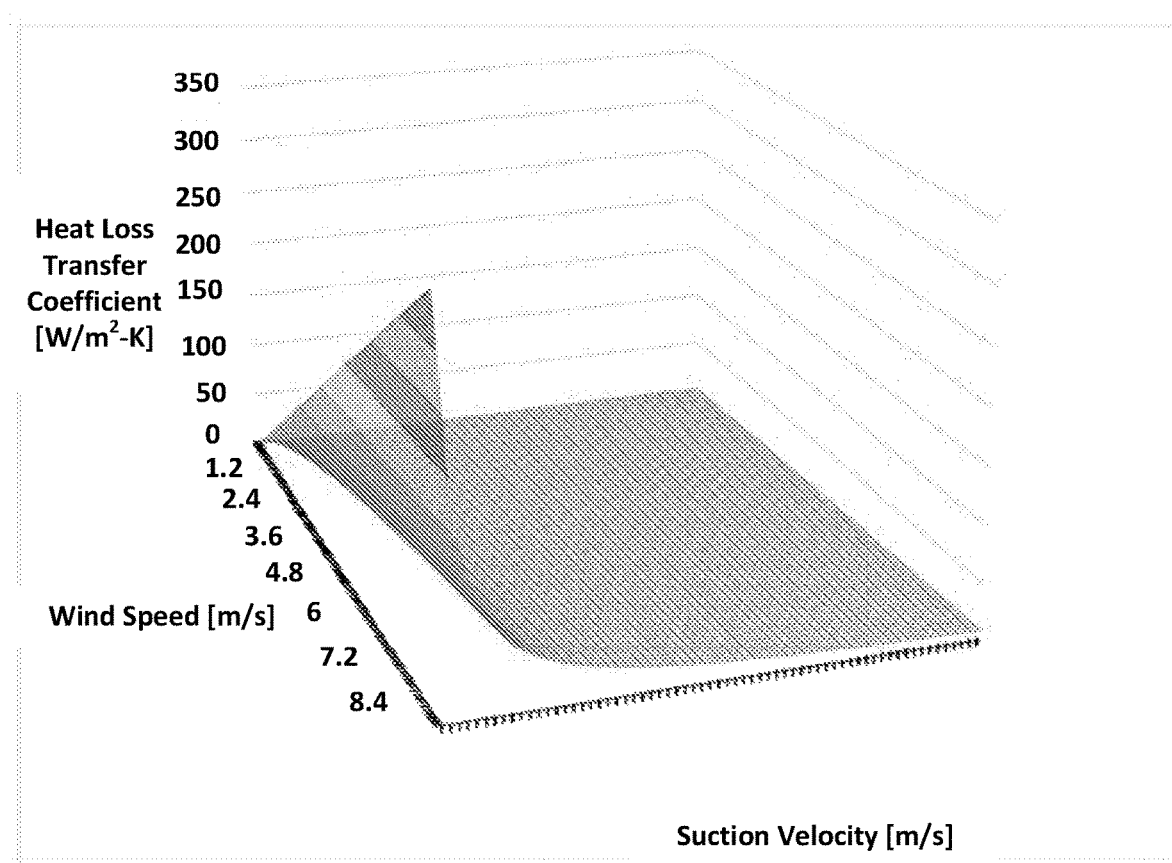
FIG. 12 illustrates the heat loss due to cross-wind for the low porosity perforated plate coefficient.
Figure 13:
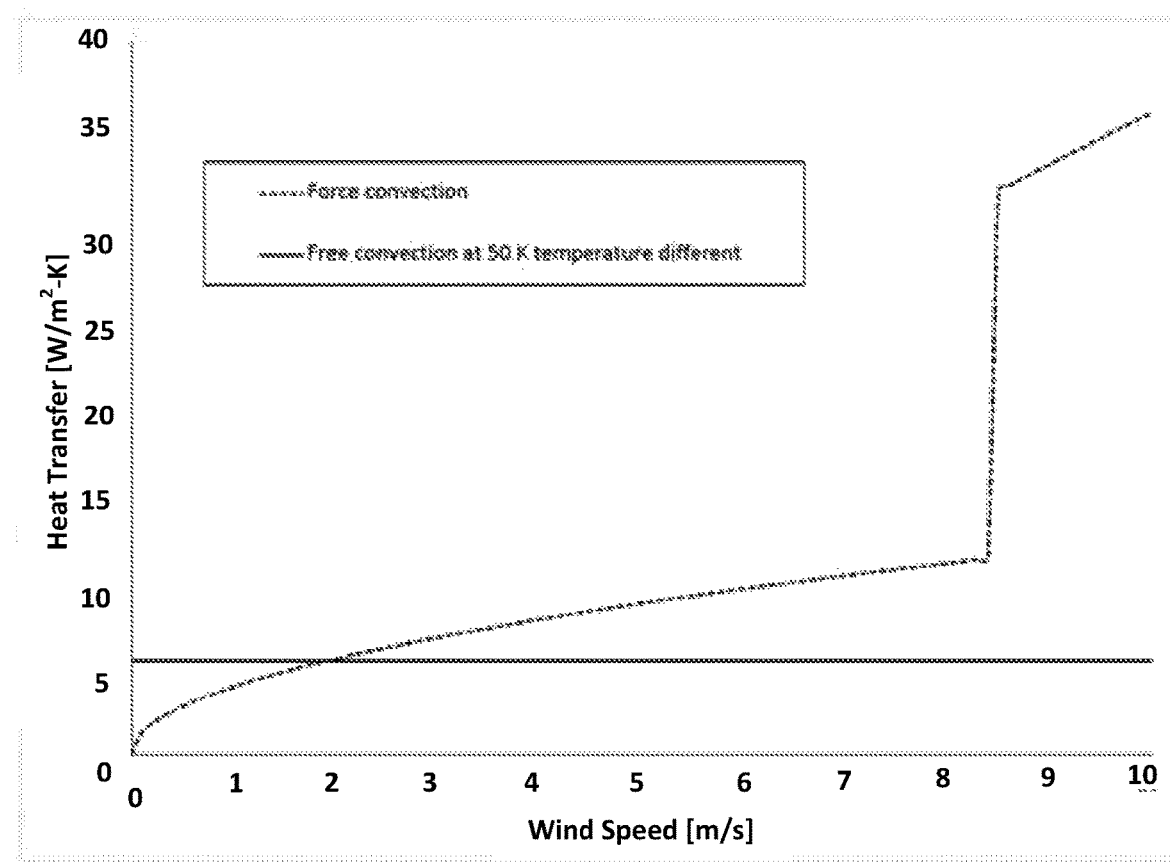
FIG. 13 illustrates the heat transfer coefficient for losses by forced convection vs. free convection at 50° K temperature difference.

The suction flow generated by a small fan captures heat and moisture accumulating in the boundary layer on the surface of the black fabric. The range of suction velocity was expected to be low because of the desire to capture humidity from the brine and thus raise the humidity of transpired air. Increased suction velocity may reduce the heat loss coefficient and increase evaporation rate, but at the same time may lower the leaving air humidity. FIG. 12 illustrates how the heat loss coefficient varies with wind speed and the suction velocity. The heat loss coefficient drops as suction velocity increases but rises as wind speed increases. Forced convection becomes zero at zero wind speed, which means that natural convection will dominate as shown in FIG. 13.

The efficiency of the black fabric may depend, at least in part, on four main elements; the absorptivity of the wet fabric, the control variables (air and brine flow rates), the geometries of the fabric and the boundary conditions. In the simulations, the effect of the geometries, such as hole diameter, porosity and thickness, is already accounted for by the heat and mass transfer coefficients. For thermal equilibrium, if all the boundary conditions are constant, eventually, the sea water and the fabric temperature will reach equilibrium temperatures. To find the air and brine outlet temperatures at given air and brine flow rates, the simulation is reiterated until the inlet sea water temperature is equal to the outlet sea water temperature.

A disadvantage that comes with all HDH cycles, compared to a solar still system, is the need of electrical energy to run a water pump and a fan. This electrical energy comes at a cost, even though it is much less than the thermal energy required ("free" solar energy). Most research has focused only on the thermal efficiency. However, without electrical grid or infrastructure, the system might have to operate on solar panels or other sources of energy, which may affect the cost of the system. The electrical energy requirement can be estimated from the water and air pressure drops and flow rates. The pressure drop across a perforated plate is determined in these simulations from the suction velocity and the porosity of the plate.

With the mathematical model of the black fabric completed, a sensitivity analyses can be made of the variables and parameters that may affect performance of the black fabric humidification-dehumidification (BFHDH) solar desalination system. There are two controlled variables in a black fabric collector that were used; the suction velocity and the sea water mass flow rate. There are also six uncontrolled boundary conditions that were explored. These six variables are the ambient temperature, humidity, pressure, the wind speed, the incident radiation, and the seawater salinity. Moreover, geometries of the black fabric may also affect performances. First, the black fabric geometries such as hole diameter, spacing between the holes and their layout pattern were assessed.

The heat transfer coefficient from the collector to the air may be, at least in part, a function of hole diameter, pitch, hole Reynolds number, porosity, wind speed and suction velocity. Since the goal is to optimize the holes size, spacing and porosity, the suction velocity and the wind speed at typical constant values should be kept. An equilateral triangular hole pattern was found to induce an approximately radial boundary-layer flow within a hexagonal (nearly circular) area around each hole thus promoting a more uniform face velocity and more uniform scavenging of the wet surface than that obtained with a square layout.

Figure 14:
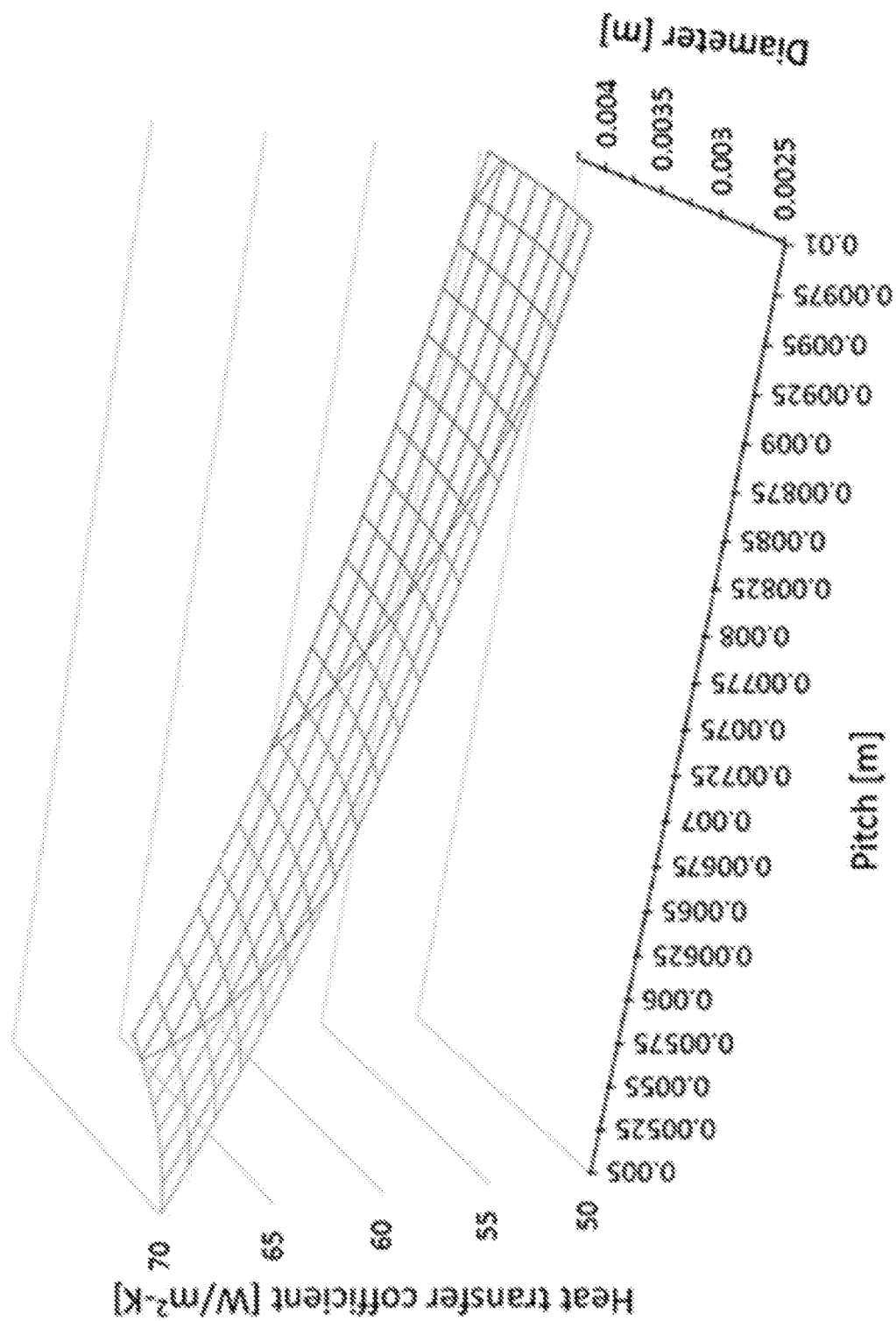
FIG. 14 illustrates the heat transfer coefficient (face area basis) at various hole diameters and spacings (pitch)

FIG. 14 indicates that smaller hole diameter and smaller pitch yield higher a heat transfer coefficient. The area of the black fabric is kept constant at 1 $m^2$. Table 4 shows the preferred hole size and spacing of the black fabric based on the simulations.

TABLE 4

Hole size and pitch of the black fabric absorber/humidifier

| Parameters | Number | Unit |
|---|---|---|
| Height (H) | 1 | $m^2$ |
| Width (W) | 1 | $m^2$ |
| Hole diameter (D) | 1.5 | mm |
| Pitch (P) | 7.5 | mm |
| Porosity (por) | 3.6% | — |

Sixteen different cases were evaluated with the range of boundary conditions based on the TMY and the sea water temperature data previously discussed. These cases are shown in Table 5. The selection was based on factors that not only affect the system performance but also affect the optimal operating point of the two control variables.

TABLE 5

Case number for sensitivity analysis

| | | Tamb = 20° C. | | Tamb = 40° C. | |
|---|---|---|---|---|---|
| | | $\omega amb$ = 0.01 | $\omega amb$ = 0.02 | $\omega amb$ = 0.01 | $\omega amb$ = 0.02 |
| Tb = 20° C. | Uw = 0.5 | 1 | 5 | 9 | 13 |
| | Uw = 10 | 2 | 6 | 10 | 14 |
| Tb = 40° C. | Uw = 0.5 | 3 | 7 | 11 | 15 |
| | Uw = 10 | 4 | 8 | 12 | 16 |

The chosen parameters in the simulations were the ambient temperature, the ambient humidity, the wind speed and the inlet sea water temperature. The other boundary conditions were fixed, including the incident radiation, the ambient pressure, salinity and the sea water mass flow rate as indicated in Table 6.

TABLE 6

Boundary conditions fixed during the simulation analysis

| Boundary condition | Value | Unit |
|---|---|---|
| Incident radiation (IT) | 600 | $W/m^2$ |
| Pressure (Pa) | 101,325 | Pa |
| Inlet salinity (Sp) | 30 | g/kg |
| Sea water flow rate (mb) | 0.01 | kg/s |

The dimension and geometry of the black fabric is shown in Table 4. All sixteen cases (a 2×2×2×2 grid) in the Table 5 were examined. Since the black fabric was designed without a cover, it was assumed it will be sensitive to the wind as the wind produces heat and moisture loss, hence a wide range (0.5 and 10 m/s) of wind speed was examined.

High yield of the HDH cycle was expected to result from air and brine flow rates that maximize the wet fabric temperature. From the analysis, the higher wind speed shifts the point of maximum temperature and humidity to higher suction velocity. Higher suction velocity reduced the heat loss coefficient and increased heat gain coefficient. Results show that the black fabric performs better in a hot climate than in a cold climate. However the analysis shows that the maximum performance is achieved in both cases at approximately the same suction velocity. Changing the ambient temperature had little effect on the optimal operating point.

A complete humidification-dehumidification solar desalination cycle comprises three processes; a heating process, a humidifying process and a dehumidifying process, and an optional recuperator process may improve heating efficiency as described herein. A solar heater is usually used in the heating process since the source of energy is solar radiation. Solar energy may be collected by either a solar air heater or a solar water heater. For the humidifying process, a spray tower, bubble column or packed bed can be used. The black fabric reducing cost and complexity already combines these two processes. A condenser is used as a dehumidifier in all HDH systems. There are variety of the cycle configurations for the HDH solar desalination, including sequencing of each component. Typically, the system can be configured in a closed air loop air or a closed water loop arrangement.

To simulate the HDH system, each individual component has to be modeled and coupled—i.e. the outlet condition of one component is used as the inlet condition of the next component. The system contains two fluid paths; the air and the sea water. They interact directly in the black fabric where the air is heated and humidified by evaporation of the sea water. The components of the cycle are the black fabric solar humidifier, a condenser and a heat exchanger. The heat exchanger is an extra component that is not always used in the conventional HDH solar desalination cycle. In the conventional cycle, the system is usually a closed-loop cycle because the heat source can produce higher temperatures than the black fabric absorber. Hence, there is no need for a heat exchanger. It was found however that the black fabric collector achieves maximum efficiency when it is operated with a recuperater.

The developed black fabric model is used as the humidifier and the solar collector. It provides many benefits over a regular humidifier and solar collector. First, the fabric does not corrode like most other solar heaters. Corrosion increases the operating and maintenance cost and shorten equipment lift-time and, accordingly, it increases water costs. Second, the cost of materials and manufacturing the fabric is much lower than a solar collector and a humidifier. Even if the performance of the system is lower than the typical HDH solar desalination system, the cost of water produced from the black fabric system is still expected to be lower. Finally, the black fabric solar humidifier makes the system simpler to maintain and operate. A complex system may require technicians and experts.

The area of the recuperater (liquid-liquid a counter-flow heat exchanger) was chosen to be equal to the area of solar humidifier. The heat transfer coefficients were evaluated from standard empirical relations. A variety of HDH cycle configurations are possible.

Reference is made to FIG. 5, a schematic of the cycle configuration used in the analysis. Consider first the air line (solid line). Fresh air from the ambient ($T_{a1}$ & $\omega_{a1}$) approaches the black fabric. The air is heated and humidified to ($T_{a2}$ & $\omega_{a2}$) as it passes over the fabric. Then it goes directly into the condenser for dehumidifying thus generating fresh water. The spent carrier air is then discharged back to ambient at ($T_{a3}$ & $\omega_{a3}$). On the seawater-side (dashed line), sea water enters the condenser as a coolant at ocean temperature ($T_{b1}$). In this process, the heat of condensation is transferred thus bringing the sea water to ($T_{b2}$). The seawater is heated further in the heat exchanger to ($T_{b3}$) before it reaches the black fabric. The seawater that comes out of the black fabric at ($T_{b4}$) is returned back to the hot side of the heat exchanger thus for pre-heating the inlet sea water ($T_{b2}$) before it is discharged back to the sea at ($T_{b5}$). The rate of water yield is calculated from the difference between condenser inlet and outlet air humidity times the air mass flow rate as in equation 23.

$$\dot{m}_w = \dot{m}_a(\omega_{a2} - \omega_{a3}) \quad (23)$$

Figure 15:
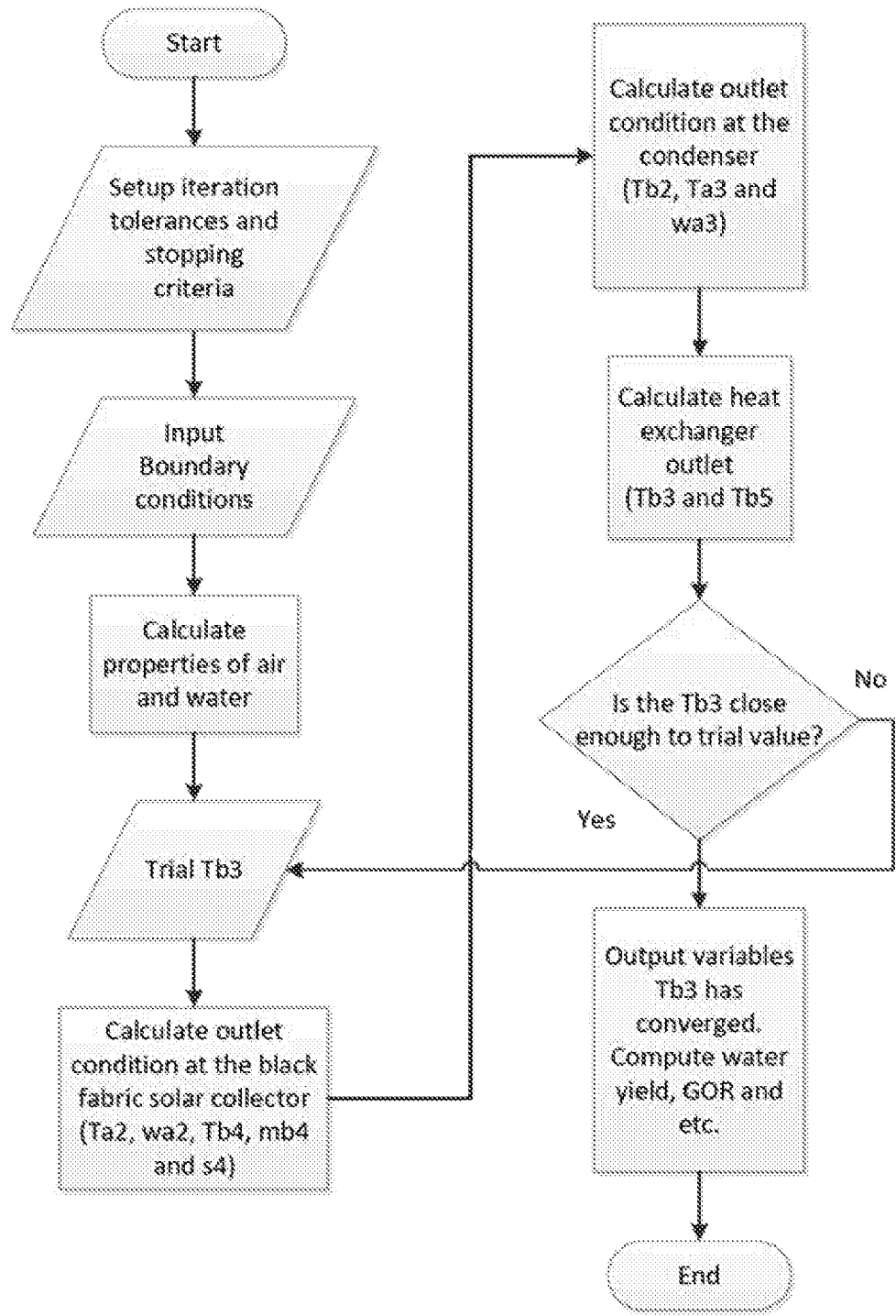
FIG. 15 illustrates a solving algorithm of the black fabric solar humidification-dehumidification (HDH) desalination.

The air- and sea-water-side equations were solved simultaneously. The air-side of the black fabric solar collect is computed first by giving a trial value of the water temperature at the inlet of the black fabric. Next, the outlet conditions of air and sea water at the condenser are calculated. Once the sea water conditions at the condenser outlet are known, the sea water outlet temperature at the heat exchanger can be evaluated. The processes are repeated until the trial value of the inlet sea water temperature of fabric is converged. FIG. 15 explains the solving algorithm in a block diagram.

Figure 16:
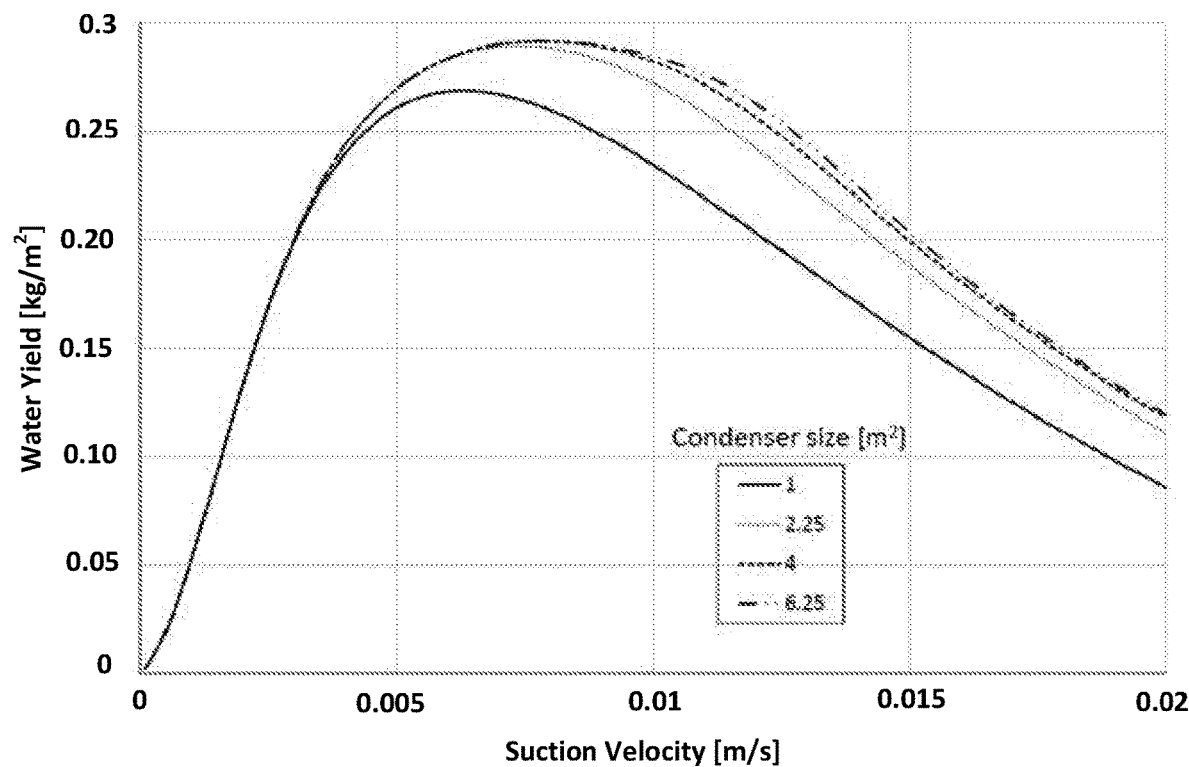
FIG. 16 shows the water yield at various condenser sizes.

The condenser may be a key component in any HDH desalination system since the water cannot be produced without it. The objective was to explore condenser size based on performance and cost. This was done by fixing all of the boundary conditions and varying the condenser size. A typical boundary condition for a normal sunshine day from the TMY data was selected and is presented in Table 7. The simulations were computed at various suction velocities as the suction velocity is the main control variable. The results are shown in FIG. 16.

TABLE 7

Boundary used in finding the condenser size

| Boundary condition | Number | Unit |
|---|---|---|
| Ambient temperature (Tamb) | 27.5 | ° C. |
| Ambient humidity (ωamb) | 0.0125 | — |
| Incident radiation (IT) | 450 | W/m² |
| Pressure (Pa) | 101,325 | Pa |
| Inlet salinity (Sp) | 30 | g/kg |
| Wind speed (Uw) | 3 | m/s |
| Sea water temperature (Tb) | 22.5 | ° C. |
| Sea water flow rate (mb) | 0.015 | Kg/s |

From FIG. 16, the water productivity at the 2.25 m² condenser size increases significantly from the 1 m² condenser size. However, as the size of the condenser increases further, the water productivity of the system barely increased. Therefore, the 2.25 m² condenser size was the selected size for the simulations.

Electrical energy used by the HDH solar desalination system is not free and has to be considered when designing the system. Energy is necessary to run a water pump (optional) and a small fan or other air mover. In places that lack a reliable gird infrastructure, a solar photovoltaic panel may be used as the HDH solar desalination also uses solar energy. In general, the solar cells in the market have an efficiency varying from 14% to 19%.

Fan electrical energy consumption to move air through the black fabric and the condenser can be calculated from the air flow rate and pressure drop across each component. The water pump is used to pump the sea water from the ocean to the condenser and to the top of the black fabric. Water pump energy is calculated in the same way from brine flow rate and the required lift from sea level to the black fabric inlet distribution pipe. Total required power in the simulation is the sum of fan power and water pump power.

An estimate of annual water productivity based on available weather data was made. The results of the simulation are shown in FIG. 7 on a monthly basis. The results are divided into two cases for each month. The gray bars indicate the results for the case of 24 hour operation while the black bars indicate the results of operation only during sunshine hours. As illustrated, little water is produced during the non-sunshine hours. Consequently, it might not be worth operating the system at night if the system is operated on solar cells because electrical energy storage may then be necessary. Water productivity is highest in May and lowest in December. The TMY data shows that May has the highest global tilted irradiance (DNI or GTI) value and December has the second lowest DNI (or GTI) value. Although June and July also have very strong solar radiation, the sea water temperature is higher, making condensation process more difficult. The total annual water yield is exhibited in Table 1 and reproduced as Table 8, below.

TABLE 8

Yearly water yield for the black fabric HDH solar desalination

| | 24 hours | Sunshine hours |
|---|---|---|
| Water yield $\left(\frac{kg}{m^2}\right)$ | 2034.845746 | 1944.008735 |

The results show that the solar HDH solar desalination system can produce approximately 2,000 liters of water per year per square meter of black fabric solar collector area. Considering that a person requires 8 liters of drinking water every day, at least 1.46 square meters of solar collector may be needed per person. When looking at the cumulative distribution function (CDF) of the yearly water productivity, the average hourly water productivity was at 0.534 liters per square meter and maximum at around 1.4 liters per square meter. Ninety nine percent of the data shows the water productivity in excess of one liter per square meter per hour. Excluding the non-sunshine hours, the average solar GOR over the year was at 0.696 liter/kWh incident radiation.

The results in FIG. 7 however do not take electrical energy consumption into consideration. It was presumed in the simulations that the system had all the electrical energy needed at all time. It was estimated to have 15 watts of electrical energy supply to cover almost 100 percent of all cases. A few cases show the power requirement up to 40 watts. When examined closely, the cases requiring up to 40 watts were during the summer time when the sea water was hot. Although, the air was hot and humid during the summer month, the sea water was also hot and the condenser required more sea water to remove the same heat of condensation.

Figure 17:
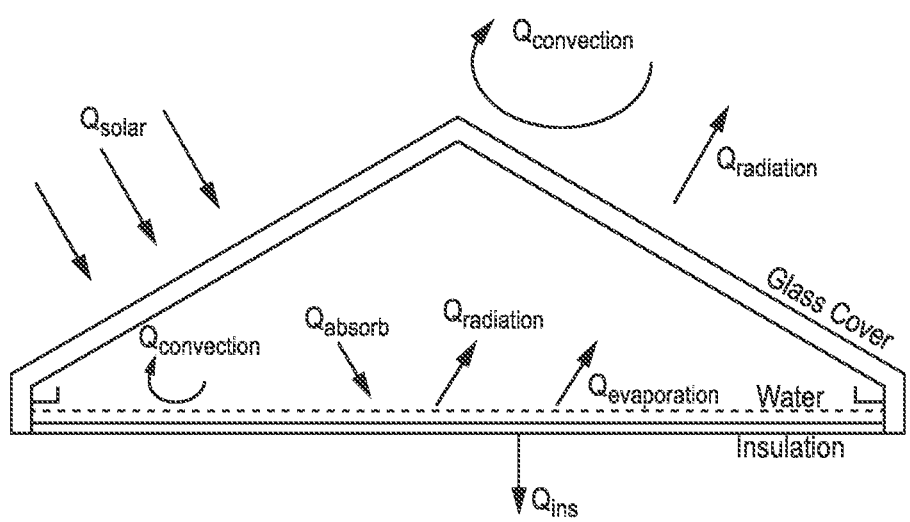
FIG. 17 illustrates a schematic of a solar still.

A solar still, a conventional HDH solar desalination and a reverse HDH solar desalination were simulated to compare with performance results of the black fabric solar HDH desalination system. As noted above, the solar still is generally the most common method for desalinating sea water in developing countries. Water is put into a shallow black basin with a glass cover. The black basin acts as a solar absorber, absorbing solar heat and transferring it to the sea water. Pure water evaporates from the sea water while leaving the salt behind. The humid air is condensed under the sloped glass cover. Finally, the condensed water flows down along the sloped glass into troughs where fresh water is collected. A schematic of a solar still is shown in FIG. 17 along with the energy flows. The main parts that have to be considered in the solar still are the glass cover, the absorber and the sea water in the basin. A solar still model was formulated under the following assumptions, sea water in the solar still is 2 cm in depth, there is no water leakage from the basin and the brine in the basin is replaced when the salt concentration is doubled i.e. when the depth falls to 1 cm.

Figure 18:
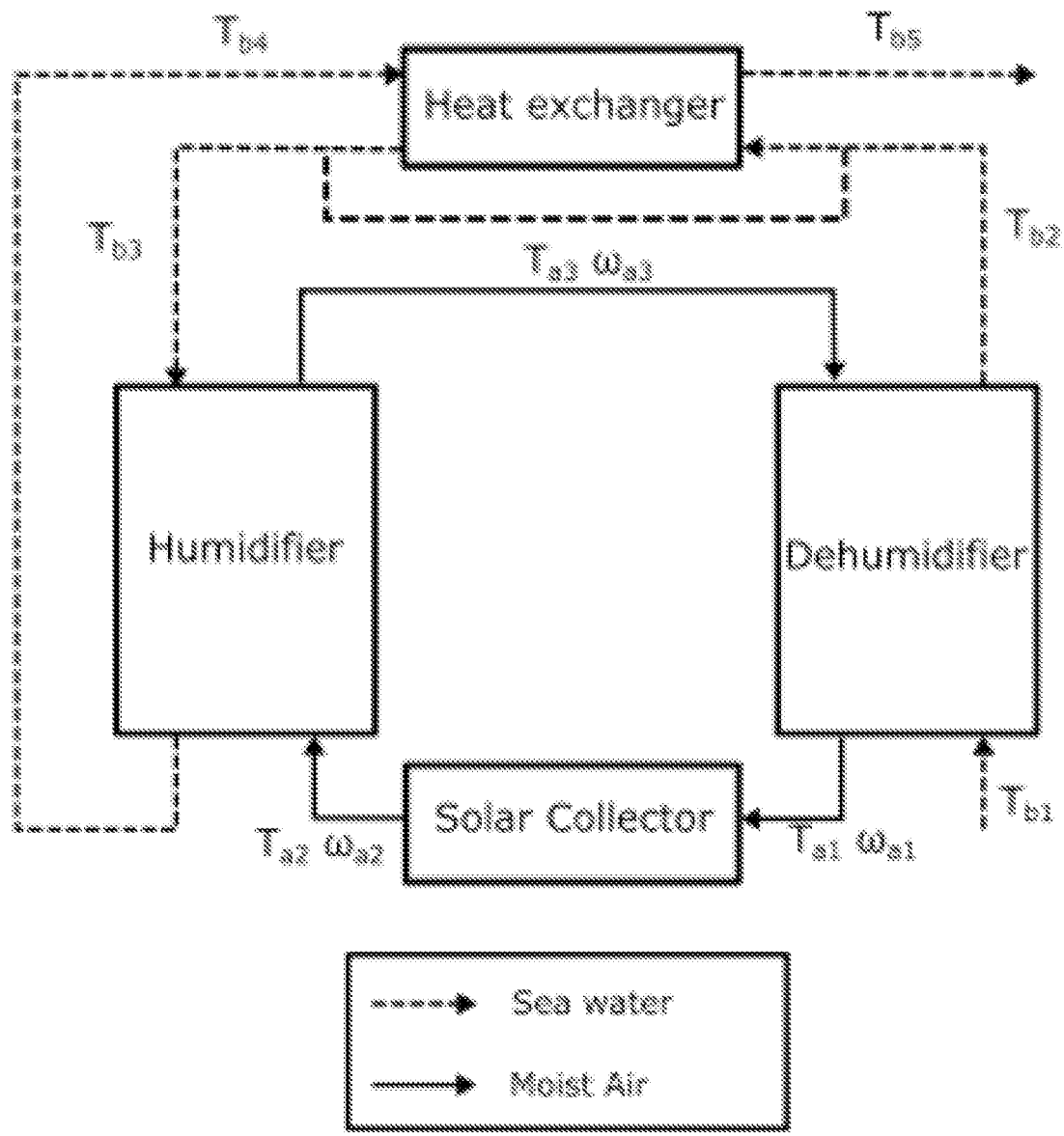
FIG. 18 provides a schematic of a conventional solar humidification-dehumidification (HDH) desalination system.

A diagram of the closed-air open-water HDH solar desalination cycle is shown in FIG. 18. To make an objective comparison with the black fabric HDH solar desalination system described herein, a heat exchanger is added into the cycle with separate solar air-heating collector. First, seawater is pumped into the dehumidifier as a coolant to remove heat from the condensation process. Then, it goes through the heat exchanger for pre-heating. However, after a few simulations, it was found that sometime the seawater that comes out of the humidifier is at lower temperature than the seawater coming out of the dehumidifier. When this happens, the model lets the seawater bypass the heat exchanger and go directly into the humidifier. On the air-side, the air is in a closed loop. First, it is heated in the solar collector. The heated air is sent to the humidifier and finally to the condenser, where fresh water collected. From the condensation it returns to solar collector.

A counter-flow sea water cooling tower model was used to model the humidifier. The sea water cooling tower has 5% to 20% lower air effectiveness than a fresh water cooling tower, depending on the salinity. Sea water properties were supplied to the model. The model of the solar air heater used in this simulation is from [Duffie and Beckman 2006]. The efficiency of the collector was 58% at a normalized gain $(T_{out}-T_{amb})/I_1=0.06$ Km²/W. The normalized gain is understood as the ratio of temperature difference to incident radiation and will decrease with increasing the mass flow rate.

Figure 19:
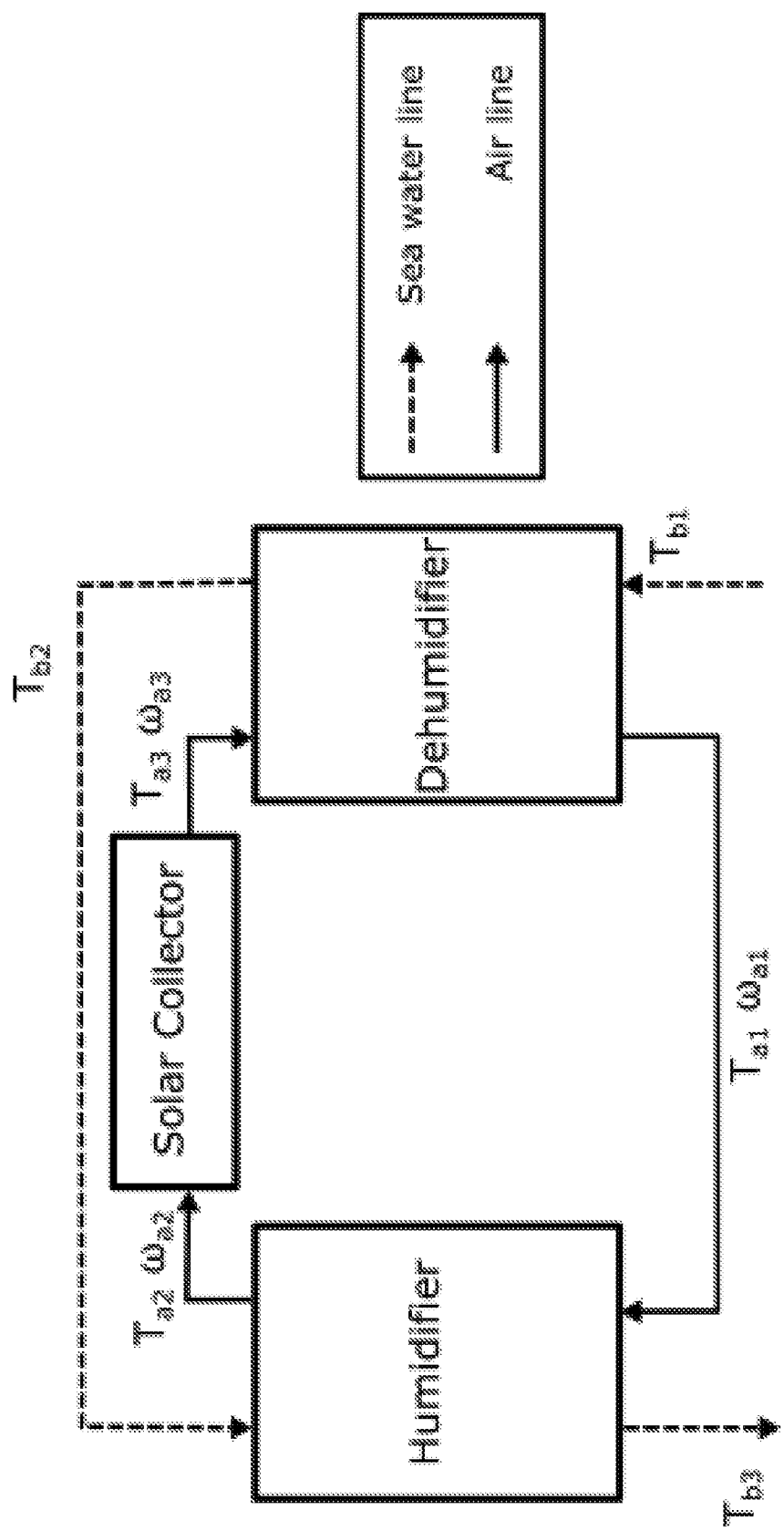
FIG. 19 illustrates a reverse HDH solar desalination system.

FIG. 19 illustrates a reverse HDH solar desalination system. The overall performance of the previous cycle was low because as soon as the air was heated in the solar collector, it lost energy to the sea water in the humidifier and that sea water was discharged directly (if the cycle was without the heat exchanger). To improve the air heated cycle, Lienhard conceived a reverse cycle in which the air is heated after the humidifier. As with the conventional HDH cycle, the reverse cycle performance map was constructed and the electrical power was computed. The results are reported and compared in FIG. 6. The reverse cycle shows the highest annual water productivity at around 4000 liters/m². This value is double the water productivity from the Black fabric (BF) HDH solar desalination system and four times that of a conventional HDH solar desalination cycle. The conventional solar HDH desalination cycle performance was only slightly better than that of a solar still. Table 9 summarizes overall performance of all systems.

TABLE 9

Summary table

|  | Solar still | Conventional HDH Solar desalination | Black fabric HDH solar desalination | Reverse HDH solar desalination |
|---|---|---|---|---|
| GOR | 0.3132 | 0.3847 | 0.7146 | 1.4576 |
| Specific electrical energy consumption (kWhe/kL) | — | 7.1497 | 6.0116 | 1.80767 |
| Solar panel area for 99% CDF (m²) | — | 1.2564 | 1.9779 | 1.4533 |

The gained output ratios (GORs) in the table were calculated by equation 24. The specific power consumption was computed in a similar way by adding all power consumed divided by total water produced as in equation 25.

$$GOR = \frac{\text{total yearly water yield}}{\text{total incident radiation}} \quad (24)$$

$$\text{specific power consumption} = \frac{\text{power consumed}}{\text{total yearly water yield}} \quad (25)$$

The reverse HDH cycle has better thermal efficiency and lowest specific power consumption. The black fabric thermal performance is almost double that of the conventional cycle, but it consumed the highest electrical power. When the wind speed was high, the system had to operate at high suction velocity to prevent large heat and water losses, resulting as high fan energy consumption. The GOR reported in the Table 9 may have lower values than the GOR from other studies because this study considered real weather and seawater temperature data into the simulation, not only the ideal weather.

The reverse cycle showed the best thermal performance because it was operated at very high temperature. Operating at high temperature may introduce many new problems such as corrosion and salt crystallization. Moreover, the reverse cycle arranged the configuration such that the air is humidified before entering the solar air collector. The humid air may shorten the life-time of the solar air heater. These complications may increase the water cost significantly.

The HDH apparatus described above and illustrated in FIGS. 1 and 3 was designed to validate the modeling under a range of the control variable at zero wind speed.

The model was evaluated at different conditions. The conditions were chosen from the TMY and the sea water data so that the analyses represented performance under the full range of realistic conditions. The analysis reveals that the solar humidifier is sensitive to the wind and performs better in a hot and humid climate. However, the energy losses from the wind might be minimized by increasing the suction velocity. Also, the black fabric could continue to operate as a humidifier when the solar radiation is zero. Experimental performance of the black-fabric humidifier agreed with the mathematical model within 10%. The model over-predicted the outlet air humidity by 5 to 10%. This discrepancy is on the order of estimated air leakage in the prototype black fabric solar humidifier box.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A solar humidifier, comprising:
a solar collector including perforations that define at least a portion of a flow path for air and an uncovered surface that defines at least a portion of flow path for brine, wherein the respective flow paths bring said air and said brine into direct contact and wherein said solar collector exhibits an absorptance in the range of 0.70 to 0.95 when dry;
a frame on which said solar collector is mounted, wherein said frame provides at least one opening for supplying said brine to said uncovered surface of the solar collector; and
a collection box, wherein said collection box includes an interior volume and is enclosed on a side by said solar collector.

2. The solar humidifier of claim 1, wherein said flow path for air is coupled to said collection box and a condenser.

3. The solar humidifier of claim 1, wherein said solar collector is fabric.

4. The solar humidifier of claim 3, wherein said fabric is microfiber or cotton.

5. The solar humidifier of claim 1, wherein said solar collector is characterized as black in color.

6. The solar humidifier of claim 1, further comprising an air mover coupled to said interior volume of said collection box.

7. The solar humidifier of claim 6, wherein said air mover is a fan.

8. The solar humidifier of claim 6, wherein said air mover is one or more of solar powered, a solar chimney, and a wind turbine.

9. The solar humidifier of claim 1, wherein said frame includes a longitudinal opening extending a length of said frame.

10. The solar humidifier of claim 1, wherein said perforations are 0.001 meters to 0.005 meters in longest linear dimension.

11. A system for solar desalination of brine, comprising:
a first brine fluid flow path coupled to a solar humidifier, wherein solar humidifier comprises: a solar collector including perforations and an uncovered surface that defines at least a portion of said first brine fluid flow path, wherein said solar collector exhibits an absorptance in the range of 0.70 to 0.95 when dry, a frame on which said solar collector is mounted, wherein said frame provides at least one opening for supplying brine to said uncovered surface of the solar collector, and a collection box, wherein said collection box includes an interior volume and is enclosed on a side by said solar collector; and a first air fluid flow path coupling said interior volume of said collection box with a condenser and an air mover, wherein the perforations define at least a portion of the first air fluid flow path and wherein the first brine fluid flow path and the first air fluid flow path bring said brine and said air into direct contact.

12. The system of claim 11, wherein said condenser is coupled in said first brine fluid flow path upstream of said solar humidifier.

13. The system of claim 11, further comprising a heat exchanger coupled in said first brine fluid flow path upstream of said solar humidifier.

14. The system of claim 13, wherein said condenser is coupled in said first brine fluid flow path upstream of said heat exchanger and said solar humidifier.

15. The system of claim 13, further comprising a second brine flow path coupled downstream from said solar humidifier, wherein said heat exchanger is coupled in said second brine flow path downstream from said solar humidifier.

16. A method of desalinating brine, comprising:
supplying fresh brine to a solar collector including perforations that define at least a portion of a flow path for ambient air and an uncovered surface that defines at least a portion of a flow path for said fresh brine, wherein the respective flow paths bring said ambient air and said brine into direct contact and wherein said solar collector exhibits an absorptance in the range of 0.70 to 0.95 when dry;
heating said ambient air with said solar collector and humidifying said ambient air with water from said fresh brine to provide humidified air;
drawing said humidified air through said perforations in said solar collector with an air mover; and
cooling said humidified air and removing said water from said humidified air.

17. The method of claim 16, further comprising increasing the temperature of said fresh brine in a heat exchanger prior to supplying said fresh brine to said solar collector.

18. The method of claim 17, wherein said fresh brine after flowing over said surface is discharged brine and said discharged brine is provided to said heat exchanger to increase the temperature of said fresh brine.

19. The method of claim 16, wherein said humidified air is cooled in a condenser.

20. The method of claim 19, further comprising passing said fresh brine through said condenser and increasing said fresh brine temperature with said humidified air prior to supplying said fresh brine to said solar collector.

* * * * *